(12) United States Patent
Dent et al.

(10) Patent No.: US 8,401,487 B2
(45) Date of Patent: Mar. 19, 2013

(54) RADIO CHANNEL ANALYZER TO DETERMINE DOPPLER SHIFTS ACROSS MULTIPLE FREQUENCIES OF A WIDEBAND SIGNAL

(75) Inventors: Paul W. Dent, Pittsboro, NC (US); Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 734 days.

(21) Appl. No.: 12/650,201

(22) Filed: Dec. 30, 2009

(65) Prior Publication Data

US 2011/0158361 A1    Jun. 30, 2011

(51) Int. Cl.
*H04B 17/00* (2006.01)
(52) U.S. Cl. .................. 455/67.11; 455/446
(58) Field of Classification Search .......... 455/67.11, 455/446; 375/224, 260, 347
See application file for complete search history.

(56) References Cited

U.S. PATENT DOCUMENTS

| | | | |
|---|---|---|---|
| 6,680,969 B1 * | 1/2004 | Molnar et al. ............. | 375/224 |
| 6,996,375 B2 | 2/2006 | Dent | |
| 6,996,380 B2 | 2/2006 | Dent | |
| 7,197,282 B2 | 3/2007 | Dent | |
| 7,224,942 B2 | 5/2007 | Dent | |
| 7,630,943 B2 * | 12/2009 | Nerguizian et al. ............. | 706/20 |
| 2005/0179591 A1 * | 8/2005 | Bertoni et al. ............. | 342/453 |
| 2006/0148429 A1 * | 7/2006 | Inogai et al. ............. | 455/115.1 |
| 2006/0239364 A1 * | 10/2006 | Wilhelmsson ............. | 375/260 |
| 2007/0099622 A1 * | 5/2007 | Rappaport et al. ............. | 455/446 |
| 2010/0215081 A1 * | 8/2010 | Bajwa et al. ............. | 375/147 |

OTHER PUBLICATIONS

Bajwa et al.: "Learning sparse doubly-selective channels", Communication, Control, and Computing, 2008 46th Annual Allerton Conference, IEEE, Piscataway, NJ, USA, Sep. 23, 2008, pp. 575-582, XP031435206, ISBN: 978-1-4244-2925-7 subsection IIA, IIIB.

Cai et al.: "Doppler Spread Estimation for Mobile Ofdm Systems in Rayleigh Fading Channels", IEEE Transactions on Consumer Electronics, IEEE Service Center, New York, NY, US, vo 1. 49, No. 4, Nov. 1, 2003, pp. 973-977, XP001201230, ISSN: 0098-3063, DOI: DOI:10.1109/TCE.2003.1261183 section II.

Shin et al.: "An Efficient Design of Doubly Selective Channel Estimation for OFDM Systems", IEEE Transactions on Wireless Communications, IEEE Service Center, Piscataway, NJ, US, vol. 6, No. 10, Oct. 1, 2007, pp. 3790-3802, XPOII194425, ISSN: 1536-1276, DOI: DOI:10.1109/TWC.2007.060134 section III subsections IIIA, IIIB.

* cited by examiner

*Primary Examiner* — Zhiyu Lu
*Assistant Examiner* — David Bilodeau

(57) ABSTRACT

A receiver and receive processing method described herein improves the accuracy of channel estimates by correcting for the assumption that the Doppler shift (or rate-of-change-of-delay) stays constant for each frequency within a signal bandwidth of a received signal. To that end, a receiver according to the present invention comprises a channel processor having multiple processing units. A first processing unit processes reference values (e.g., pilot signals) received for each of a plurality of frequencies within a signal bandwidth at a plurality of different signal times (or the complex propagation channel coefficients estimated therefrom) to determine a set of complex wave amplitudes either for each of multiple frequencies in the signal bandwidth or for each of the different signal times. A second processing unit subsequently processes the complex wave amplitudes to determine complex scattering coefficients, where each complex scattering coefficient corresponds to a respective scattering object in the wireless communication channel.

38 Claims, 11 Drawing Sheets

RADIO CHANNEL ANALYZER TO DETERMINE DOPPLER SHIFTS ACROSS MULTIPLE FREQUENCIES OF A WIDEBAND SIGNAL

BACKGROUND

The present invention relates generally to channel estimation, and more particularly, to improving the accuracy of scattering object characterizations used to determine channel estimates.

In a wireless communication system, objects (e.g. buildings, hills, etc.) in the environment, referred to herein as scattering objects, reflect a transmitted signal. The reflections arrive at a receiver from different directions and with different path delays. The reflections or multi-paths can be characterized by a path delay and a complex delay coefficient. Typically, a scattering object is characterized by complex delay coefficients that show fast temporal variation due to the mobility of the vehicle, while the corresponding path delays are relatively constant over a large number of transmission intervals.

Channel estimation is the process of characterizing the effect of the radio channel on the transmitted signal. Channel estimates approximating the effect of a recent propagation channel on the transmitted signal may be used for interference cancellation, diversity combining, ML detection, and other purposes. Channel estimates may also be used to provide a transmitter with knowledge of a future transmission propagation channel. The U.S. patents to Applicant Dent listed below are incorporated by reference herein, and individually or jointly disclose the benefits that may be obtained in a mobile communications system when a transmitter, e.g., a fixed base station, obtains knowledge of the characteristics of the transmission propagation channels, e.g., the downlink propagation channels.

U.S. Pat. No. 6,996,375 titled "Transmit diversity and separating multiple loopback signals;"

U.S. Pat. No. 6,996,380 titled "Communications system employing transmit macrodiversity;"

U.S. Pat. No. 7,197,282, titled "Mobile Station loopback signal processing;" and U.S. Pat. No. 7,224,942 titled "Communications system employing non-polluting pilot codes."

Methods for providing knowledge of a past propagation channel, described in the above and other known art, include providing feedback signals from the mobile stations, looping back signals from the mobile stations, and using the same frequency for the downlink as for the uplink in a so-called Time-Division-Duplex (TDD) system.

TDD operation is however not always appropriate, particularly when the communications system operates over long ranges, making the concept of simultaneity in different places moot. Also, including deliberate loopback or feedback signals in transmissions from mobile stations to fixed base stations may require a large amount of uplink capacity when speeds are high. Therefore, there is interest in methods that enable a transmitter to determine the transmission channel in advance based on normally received traffic, even when the reception frequency band is different than the transmission frequency band. Extrapolating channel information that has been determined by analyzing signals over a reception frequency band, e.g., a 20 MHz bandwidth centered at one center frequency, to channel information for a transmission frequency band centered at another center frequency separated from the reception center frequency by, e.g., 200 MHz, places challenging requirements on the accuracy of the channel model and estimates of the model parameters. In fact, extrapolating channel parameters to a different frequency band places the greatest requirements on the accuracy of the scattering object model used to represent the propagation channel environment. Improved accuracy would however be welcomed for other purposes too, such as for better data decoding, position determination, etc.

It is generally assumed that estimates of radio propagation channels are limited by a certain "coherence bandwidth," meaning that signals separated by more than the coherence bandwidth likely have no correlation between their propagation channels. Similarly, it is generally assumed that estimates of radio propagation channels are limited by a certain "coherence time," meaning that there is no expected coherence between channel values taken at times separated by more than the coherence time limit. However, the inventors postulate that current coherence bandwidth and time limits are not hard limits and instead are more a symptom of the channel model inaccuracies. Thus, the inventors propose that a more complex and more accurate channel model will increase the coherence bandwidth and coherence time limits, and perhaps even eliminate the perception of a limited coherence bandwidth and time. In environments characterized by a large number of physically small and randomly distributed scattering objects, such as leaves on trees, it may still not be possible to build a channel model of adequate complexity and accuracy to overcome the perception of a coherence bandwidth limit. However, the basic postulate may be valid in other environments characterized by a reasonable number of large scattering objects.

While researching the above issues, the applicants filed the following related U.S. patent applications, which are hereby incorporated by reference herein:

U.S. patent application Ser. No. 12/478,473 titled "Improved Mobile Radio Channel Estimation," which describes a "delay-first" approach to characterizing each scattering object by its path delay and Doppler shift. Several adaptations and improvements to the Prony algorithm were combined therein for determining the path delays and Doppler shifts. The Prony algorithm was adapted first to analyze a radio channel in order to determine scattering path delays. Then the amplitude versus time of each delayed ray was further analyzed by a second adaptation of the Prony algorithm to resolve different Doppler shifts for each path delay.

U.S. patent application Ser. No. 12/478,520 titled "Continuous Sequential Scatterer Estimation," which discloses that a Doppler shift is in fact simply another measure of rate-of-change of delay, e.g., relative velocity, and that a useful scattering object characterization comprises path delay and rate-of-change of delay, rather than path delay and Doppler shift. Thus, after finding different path delays and Doppler shifts using the Prony method, the Doppler shifts were translated to rate of change of delay values, and then a Kalman algorithm was used to track the path delay and its derivative while using the Prony algorithm to search for new scattering objects not already being tracked by the Kalman filter.

U.S. patent application Ser. No. 12/478,564 titled "Channel Extrapolation from one Frequency and Time to Another," which extrapolates propagation channel information from one time and frequency, e.g., a reception time and frequency or frequency band, to another time and frequency, e.g., a transmission time and frequency or frequency band. This application places the toughest accuracy requirements on scattering parameter estimation.

The above-referenced applications generally assume that the Doppler shift/rate-of-change-of-delay is constant over a received signal bandwidth. When signal bandwidths are small, so that there is little difference between a highest signal frequency and a lowest signal frequency, this assumption is generally accurate. Thus, for narrowband signals, translation from Doppler shift to rate-of-change-of-delay can be made accurately by just using the center frequency. However, wireless communications continue to demand, obtain, and use more and more bandwidth in the quest for higher data rates. For wideband signals, a given rate-of-change-of-delay does not translate exactly to the same Doppler shift at the edges of the bandwidth. For very wideband applications, this error can hinder the achievement of the most ambitious accuracy goals, such as those required for channel extrapolation to different frequency bands or widely separated times. Therefore, a more accurate method of resolving a radio channel into the scattering parameters of path delay and Doppler shift (or rate-of-change-of-delay) is required when using very wideband signals.

SUMMARY

The present invention improves the accuracy of channel estimates by correcting for the assumption that the Doppler shift (or rate-of-change-of-delay) stays constant for each frequency within a signal bandwidth of a received signal. More particularly, the scattering parameter estimation described herein determines scattering parameters more accurately for wideband signals by eliminating the approximation that Doppler shift is substantially constant over the bandwidth. Eliminating this approximation allows more accurate determination of both path delays and Doppler, or rate-of-change-of-delay.

Obtaining better estimates of rate-of-change-of-delay values allows channel estimates to be extrapolated further ahead in time, while obtaining more accurate path delays allows channel estimates to be extrapolated further away in frequency. For example, extrapolating the channel from a receive frequency band at around 2 GHz to a transmit frequency band approximately 200 MHz away is the most ambitious goal of the research on which this application and the herein incorporated applications are based. The ability to extrapolate the channel estimates to different times and/or frequencies will allow reduction or elimination of channel feedback from a mobile receiver to the transmitting network, which is excessively voluminous at high speeds with current techniques.

The methods described herein are designed to process wideband signals to identify hundreds of individual scattering objects in the communication channel, which is one or more orders of magnitude more than the handful of multipath rays that have been used in the prior art. It will be appreciated, however, that the present invention may be used to process signals having any number of frequencies to identify only a few scattering objects.

A receiver according to the present invention comprises a channel processor having multiple processing units. A first processing unit processes reference values (e.g., pilot signals) received for each of a plurality of frequencies within a signal bandwidth at a plurality of different signal times (or the complex propagation channel coefficients estimated therefrom) to determine a set of complex wave amplitudes either for each of multiple frequencies in the signal bandwidth or for each of the different signal times. A second processing unit subsequently processes the complex wave amplitudes to determine complex scattering coefficients, where each complex scattering coefficient corresponds to a respective scattering object in the wireless communication channel.

While the present invention is described in terms of multiple processing functions individually performed by different processing units, it will be appreciated that two or more of the processing functions may be implemented by a single processor. Further, the multiple processing functions of the present invention may be embodied in hardware and/or in software (including firmware, resident software, micro-code, etc.), including an application specific integrated circuit (ASIC). Furthermore, the present invention may take the form of a computer program product on a computer-usable or computer-readable storage medium having computer usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium.

In one embodiment, the first and second processing units respectively comprise Doppler and delay processing units. The Doppler processing unit processes the reference values or the complex propagation channel coefficients estimated therefrom to determine a set of Doppler shifts of scattered wave energy and a corresponding set of complex wave amplitudes output by the Doppler processing unit for each of said frequencies. Each Doppler shift in a particular set corresponds to a different angle of arrival, and the Doppler shifts for different frequencies correspond to the same angle of arrival. The delay processing unit subsequently processes the complex wave amplitudes output by the Doppler processing unit to determine a set of path delays corresponding to each angle of arrival, and a complex scattering coefficient for each combination of path delay and angle of arrival.

In another embodiment, the first and second processing units respectively comprise delay and Doppler processing units. The delay processing unit processes the reference values or the complex propagation channel coefficients estimated therefrom to determine a set of path delays and the corresponding set of complex wave amplitudes for each of the signal times. The Doppler processor subsequently processes the complex wave amplitudes to determine a set of angles of arrival for each determined path delay, and a complex scattering coefficient for each combination of path delay and angle of arrival.

In still another embodiment, the channel processor includes an interpolator configured to re-sample by interpolation the reference values or the complex propagation channel coefficients estimated therefrom to generate interpolated values at a series of re-sampled times. The re-sampled times have a different time spacing for different ones of the frequencies of the signal bandwidth. More particularly, the product of the time spacing between the re-sampled times and the corresponding frequency is substantially constant for all frequencies. The first processing unit subsequently processes the interpolated values to determine the sets of complex wave amplitudes.

When the first and second processing units comprise the Doppler and delay processing units, respectively, the Doppler processing unit jointly processes the interpolated values to determine one set of frequency-scaled Doppler shifts common to all of the corresponding frequencies in the received signal bandwidth, and the corresponding sets of complex wave amplitudes (e.g., Doppler coefficients), where the frequency-scaled Doppler shifts represent rate-of-change-of-delay values that each correspond to the same angle of arrival for all of the frequencies and re-sampled times. The delay processing unit subsequently processes the Doppler coefficients to determine the set of path delays and the corresponding sets of scattering coefficients.

When the first and second processing units comprise the delay and Doppler processing units, respectively, the delay processing unit jointly processes the interpolated values to determine a set of path delays common to all of the re-sampled times and a corresponding set of complex wave amplitudes (e.g., delay coefficients) for each re-sampled time. The Doppler processing unit subsequently processes the delay coefficients to determine a set of frequency-scaled Doppler shifts common to all of the corresponding frequencies in the signal bandwidth, and the corresponding complex scattering coefficients, where the frequency-scaled Doppler shifts represent rate-of-change-of-delay values that each correspond to the same angle of arrival for all of the corresponding frequencies and re-sampled times.

DETAILED DESCRIPTION

Figure 1:
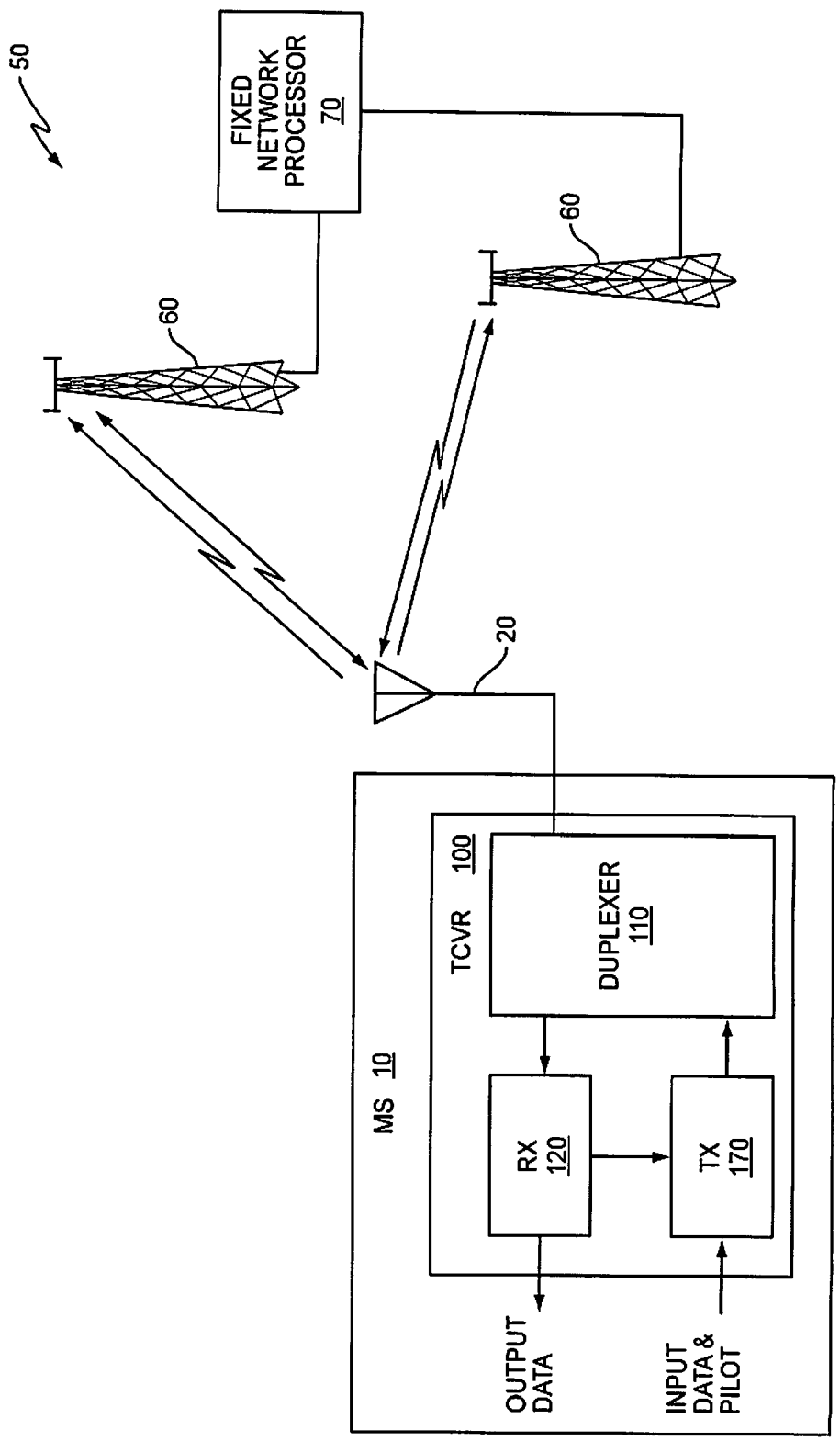
FIG. 1 shows an exemplary MISO wireless system.

The present invention increases the accuracy of different scattering coefficients determined for different scattering objects in a wireless channel by determining an accurate rate-of-change-of-delay/Doppler shift for each of multiple frequencies within the signal bandwidth of a received signal. Broadly, the present invention receives a reference value for each of multiple frequencies within a signal bandwidth at a plurality of different sample times, and applies Doppler and delay processes to the reference values or complex channel coefficients estimated therefrom to determine the scattering coefficients.

One exemplary embodiment first applies a Doppler process to the reference signals (or complex propagation channel coefficients derived therefrom), and subsequently applies a delay process to the results of the Doppler process. For this embodiment, the application of the Doppler process generates a set of Doppler shifts of scattered wave energy and a corresponding set of complex wave amplitudes for each of the frequencies in the received signal bandwidth, where each Doppler shift in a particular set corresponds to a different angle of arrival. The subsequent application of the delay process determines a set of path delays corresponding to each angle of arrival, and a complex scattering coefficient for each combination of path delay and angle of arrival.

Another exemplary embodiment first re-samples by interpolation the reference signals or complex propagation channel coefficients derived therefrom to generate interpolated values at a series of re-sampled times. The re-sampled times have a different time spacing for different ones of the frequencies of the signal bandwidth. More particularly, the product of the time spacing between the re-sampled times and the corresponding frequency is substantially constant for all frequencies.

Subsequently, this embodiment of the present invention applies the Doppler process to the interpolated values, and applies the delay process to the results from the Doppler process. For this embodiment, the Doppler process jointly processes the interpolated values to generate a set of frequency-scaled Doppler shifts common to all of the multiple frequencies in the signal bandwidth, and thereby determines a set of rate-of-change-of-delay values that each correspond to the same angle of arrival across the frequencies in the signal bandwidth. The complex wave amplitudes, e.g., Doppler coefficients, are determined for each of the frequencies based on the rate-of-change-of-delay values and the interpolated values. The subsequent application of the delay process to the complex wave amplitudes produces a set of path delays corresponding to each angle of arrival, and a complex scattering coefficient for each combination of path delay and angle of arrival.

Still another exemplary embodiment applies the delay process to the interpolated values, and subsequently applies the Doppler process to the results from the delay process. For this embodiment, the delay process jointly processes the interpolated values to generate a set of path delays common to all re-sampled times and a corresponding set of complex wave amplitudes for each re-sampled time. The subsequent application of the Doppler process to the complex wave amplitudes determines a set of frequency-scaled Doppler shifts for each determined path delay, and thereby determines a set of rate-of-change-of-delay values that each correspond to the same angle of arrival across the frequencies in the signal bandwidth. The scattering coefficients are then determined for each path delay/frequency-scaled Doppler shift combination based on the rate-of-change-of-delay values and the corresponding complex wave amplitudes.

The present invention discloses new methods that may be used to obtain improved estimates of the total channel characteristics needed for coherent demodulation in the receiver, and/or for estimating the total channel characteristics of a future channel. In MIMO/MISO systems (Multiple In, Multiple Out/Multiple In, Single Out) that use multiple transmit and/or multiple receive antennas, the transmitter is adapted to the matrix of channels from the transmitter to the receiver. The channel characteristics for the channels between each transmitting antenna to each receiving antenna are estimated. To assist in this process, each antenna transmits distinguishable pilot symbol sequences to assist in that process. In MISO systems, channel information for each transmitting antenna enables the transmitter to perform channel-adapted beamforming to favor the intended receiver.

Methods to provide the transmitter with channel knowledge is a major subject of current research, and can include feedback, as described in the above-incorporated patents to Applicant Dent, or alternatively can be based on using the same frequency for transmitting and receiving in alternate directions, in Time-Division Duplex or "ping-pong" fashion. In systems where transmit and receive frequencies are different however, and limited feedback is too slow due to high mobile station speed, the only remaining possibility is to try to deduce transmit channel characteristics in the transmit frequency band by extrapolating receive channel characteristics measured by an associated receiver in the receive frequency band, as proposed in U.S. patent application Ser. No. 12/478,564. Such extrapolation techniques require highly accurate propagation channel models, which are provided by the current invention.

The invention is described herein relative to an Orthogonal Frequency Division Multiplex (OFDM) radio communications system. It will be appreciated, however, that the present invention may be applied to any system that transmits and receives signal waves scattered by objects in the propagation environment, for example, sonar systems. The present invention may also be applied to non-OFDM systems, such as CDMA systems, by including in the CDMA system apparatus, signal processing algorithms, pilot codes or other techniques to permit the estimation of the propagation channel frequency response at a receiver.

Before providing the details of the present invention, the following first generally describes OFDM and OFDM transmitters and receivers. OFDM is of interest as one method of reducing the complexity of equalizing methods needed to communicate high data rates in a multi-path channel. In OFDM, a wide bandwidth is divided into a number of equally spaced, narrower sub-bandwidths, and a fraction of the total data rate is modulated onto a subcarrier frequency centered in each of the narrow sub-bandwidths. The equalizing problem therefore reduces to equalizing, as necessary, each of the sub-bandwidths. As with other communications methods, OFDM still benefits from knowledge of the transmission channel phase at each OFDM subcarrier frequency. This knowledge allows coherent demodulation, which is more efficient. Knowledge of the transmission channel characteristics at each subcarrier frequency is equivalent to total knowledge of the wideband channel characteristics, however the channel is divided.

In the following description, reference will be made to different time periods and intervals, which will be clarified first. A wideband signal is produced by modulating a carrier frequency with a time-waveform that changes rapidly, in a short period that may be termed a modulation interval, a chip period, or the like. This is the shortest time period involved. An OFDM symbol comprises a large number of such modulation intervals—at least as many as there are subcarrier frequencies in the OFDM symbol. The set of modulation samples, spaced in time by the modulation interval, is computed by periodically Inverse Fourier Transforming a set of phases and amplitudes, one per subcarrier. Each Fourier Transforming period is termed an OFDM symbol period. Data symbols are encoded into the choice of each phase and amplitude by some chosen modulation scheme, such as 256 QAM, so that every subcarrier carries a data symbol. The total duration of the time-waveform output by the IFT is equal to the reciprocal of the subcarrier spacing, and is called the OFDM symbol period. This may be extended by appending a so-called cyclic prefix, but some OFDM systems, known as Pulse-Shaped OFDM, do not need to extend the duration of the OFDM symbol to accommodate a cyclic prefix. In effect, the cyclic repeats of the OFDM symbol in pulse shaped OFDM symbols are permitted to overlap adjacent symbols, and therefore do not add a time-overhead. Therefore the potential use of a cyclic prefix is ignored for the rest of the discussion. A number of OFDM symbols may be collected together over a total analysis time interval, the total analysis time interval therefore being an integral number of OFDM symbol periods.

Reference will be made to various time domains and frequency domains, which can also be confusing, so are clarified below. One frequency domain of the signal comprises the frequency span from the first to the last OFDM subcarrier used. The OFDM signal also exists as a time waveform in the signal time domain, which is related to the signal frequency domain by the Fourier Transform.

A second frequency domain arises when looking at variations in signals arriving via scattered rays that are received from different objects with different Doppler shifts, due to having different relative velocities to a communicating station. If data symbol modulation is removed, the signal on any subcarrier would still therefore be perceived to vary with time, and therefore possess a spectrum of finite width. This Doppler spectrum exists in the frequency domain also, but is very narrow even compared to a single OFDM subcarrier spacing. For example, a typical subcarrier spacing is 15 kHz, while a typical Doppler spectrum is only 100-200 Hz wide. The signal time variation that gives rise to the Doppler spectrum is from one OFDM symbol period to the next, and a total analysis interval of many OFDM symbol periods is required to resolve the Doppler spectrum. The frequency domain in which the Doppler spectrum resides may be called the Doppler domain.

The value of the amplitude and phase of a given subcarrier for a given OFDM symbol, ignoring data symbol modulation, is the result of the sum of many scattered waves of different phase and amplitude, and these may add constructively or destructively in each subcarrier bin. If the resultant phase and amplitudes are plotted versus subcarrier frequency, a variation with frequency will be evident, which is the channel frequency response. If the channel frequency response is Inverse Fourier Transformed, the channel impulse response will be obtained. The impulse response indicates very approximately that the composite signal comprises the sum of a number of relatively delayed rays, and is a plot of amplitude and phase versus delay, referred to as the Delay Domain. The actual path delays do not necessarily fall in the discrete time bins implied by the use of an IFT, which is an issue that the applicants addressed by an inventive adaptation of the Prony Algorithm in the above-incorporated applications.

FIG. 1 shows one exemplary transceiver 100 implemented in a mobile station 10 in communication with a wireless network 50. Network 50 comprises a multi-antenna fixed network that transmits/receives signals to/from the mobile station 10 via two or more fixed base stations 60 communicatively coupled to a network processor 70, where each base station 60 may comprise one or more transmission antennas. Each base station 60 transmits one or more signals, e.g., OFDM signals, to the mobile station 10 via a wireless propagation channel. Mobile station 10 receives the transmitted signals using antenna 20 and passes them to the transceiver 100 to, among other things, determine scattering coefficients associated with the scattering objects present in the wireless propagation channel, and in some cases provide channel feedback to the base stations 60. While FIG. 1 shows the inventive transceiver 100 as being part of the mobile station 10, it will be appreciated that transceiver 100 may alternatively be implemented in base station 60, or any other wireless device.

Transceiver 100 comprises a duplexer 110, receiver 120, and transmitter 170, and is configured to process received signals, including determining channel estimates and scattering coefficients according to the inventive processes described herein. In particular, receiver 120 filters, samples, and digitizes the received OFDM signal, and subsequently applies a frequency transform to the digitized OFDM signal to separate the downlink pilot signal values carried by one or more reception subcarrier frequencies from the downlink data signal values carried by one or more of the remaining reception subcarrier frequencies. Transmitter 170 processes input signal data, which may include feedback data provided by receiver 120, and applies digital-to-analog conversion to generate a transmission signal, e.g., a quadrature modulating (I, Q) signal, which is subsequently up-converted, amplified, and transmitted via the transmit path of duplexer 110 and antenna 20 to provide the uplink data, pilot signals, and/or channel feedback in an uplink OFDM signal transmitted to the base station 60.

Figure 2:
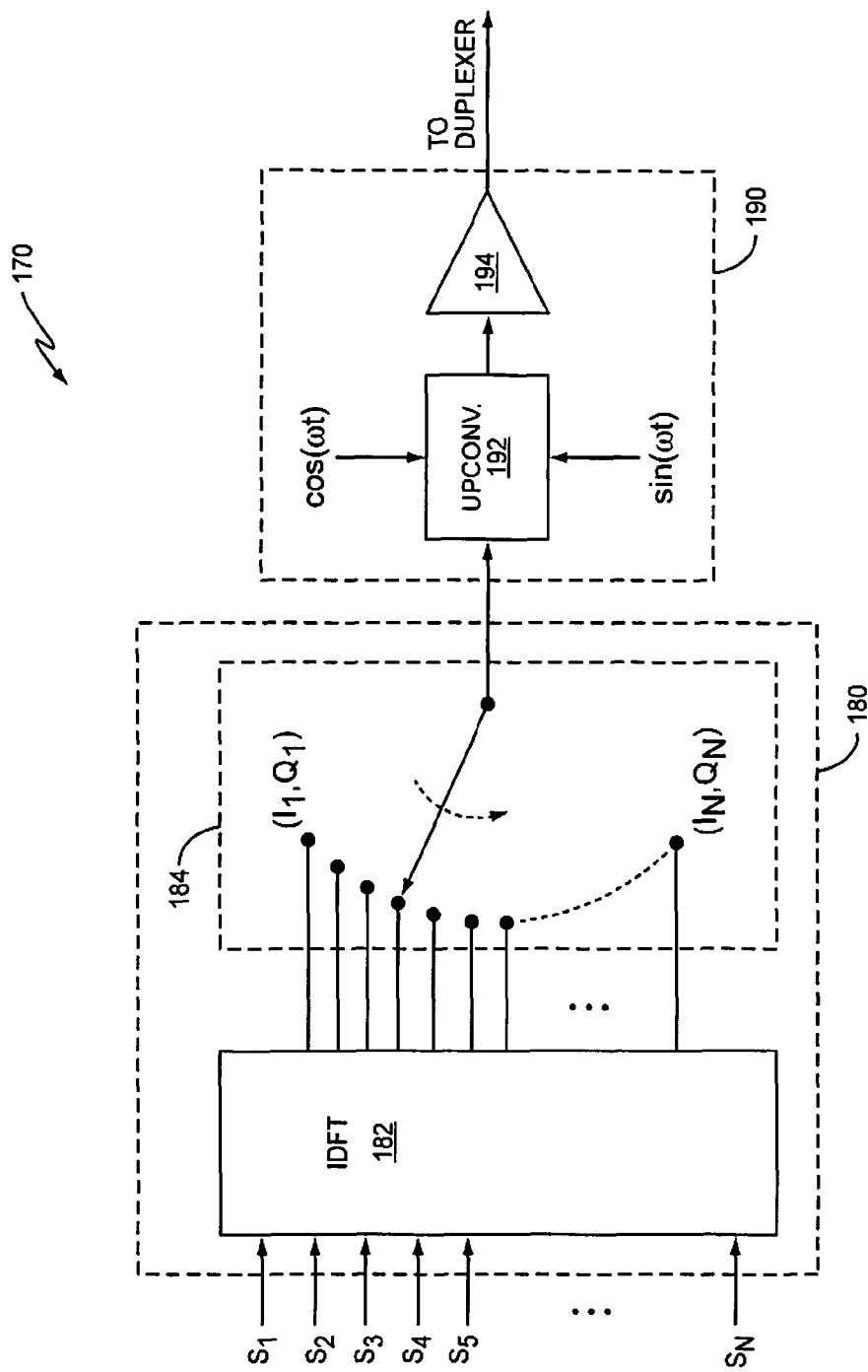
FIG. 2 shows an exemplary OFDM transmitter.

FIG. 2 shows simplified internal details of transmitter 170 when adapted to transmit OFDM signals. Signal values $(S_1, \ldots, S_J)$ to be transmitted on different subcarriers, e.g., data and/or pilot signals, are input to an OFDM modulator 180 comprising a frequency transform unit 182, e.g., an Inverse Discrete Fourier Transform (IDFT) unit, and a parallel-to-serial converter 184. Transform unit 182 may comprise a specialized, hardwired IDFT circuit or a DSP implementation that frequency transforms the J input values to at least J output values. Parallel-to-serial converter 184 converts the frequency transformed values from parallel form to serial form by successively selecting the frequency-transformed values in a fixed order. Because the values output by IDFT 182 may be complex, each value in the serial signal stream may be complex, in which case the serial stream comprises a stream of real parts and a stream of imaginary parts, e.g., a stream of (I,Q) values.

In some cases, it is advantageous to further use transform unit 182 to over-sample the input signals to generate more than J output values. For example, a 2048-point IDFT unit may transform J=1200 input values to 2048 output values. The 848 unused inputs may be set to zero, representing 424 empty spectral bins on either side of the 1200 spectral bins used for the 1200 input values. Oversampling by the factor 2048:1200 simplifies subsequent anti-aliasing filtering needed to limit out-of-band spectral energy.

The serial signal stream output by OFDM modulator 180 is applied to transmission unit 190 comprising an up-converter 192 and amplifier 194, e.g., a power amplifier. Up-converter 192 converts the stream of values, which may comprise a stream of I-values and the stream of Q-values, to continuous-time signals using known filtering, digital-to-analog conversion, and up-conversion techniques to generate an OFDM modulated radio frequency signal. The filter frequency response of the up-converter 192 passes frequencies corresponding to the used spectral bins, e.g., the 1200 bins exemplified above, while attenuating frequencies beyond the exemplary 2048 bins. Thus, oversampling as described above leaves a margin between the required passband and the required stop band so that the filter is not required to have a steep rate of cut-off. Amplifier 194 amplifies the multi-carrier radio frequency signal to a desired transmit power level for transmission via antenna 20.

Figure 3:
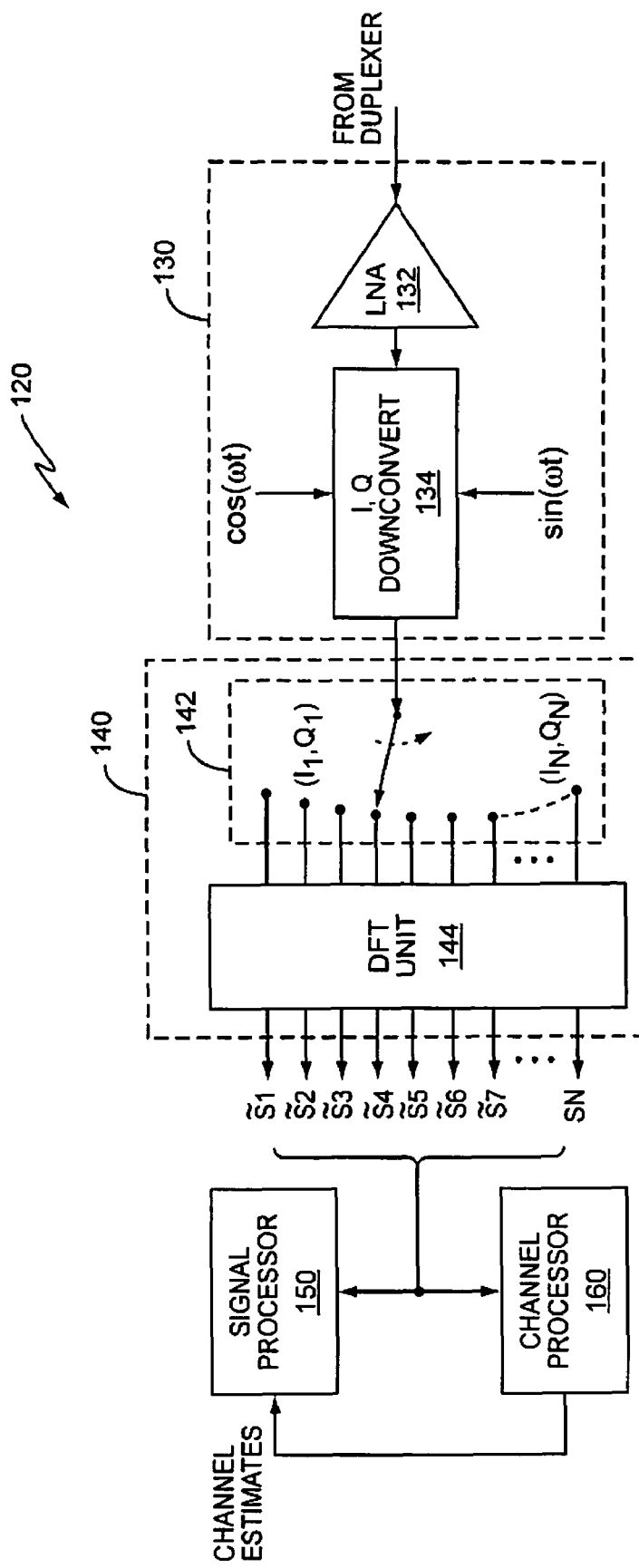
FIG. 3 shows an exemplary OFDM receiver.

FIG. 3 shows simplified internal details of receiver 120 when adapted to decode OFDM signals. The signal output by duplexer 110 is input to a reception unit 130 comprising an amplifier 132, e.g., a low-noise amplifier (LNA), and a downconverter 134. Amplifier 132 amplifies the received signal, which is subsequently downconverted, analog-to-digital converted, and filtered in downconverter 134 to generate a complex digital baseband signal. The reception unit 130 may comprise any known downconverter having the means to select an operating frequency, means to filter the received signal to select the signal bandwidth centered on the selected operating frequency, and means to sample and analog-to-digital convert the filtered signal to generate complex digital I,Q samples. For example, the reception unit 130 may comprise a zero-IF or homodyne reception unit, a low-IF reception unit, or a conventional superheterodyne reception unit in which the final IF signal is demodulated by mixing with cosine and sine reference signal waveforms in a quadrature mixer arrangement, or the logpolar receiver defined by Applicant's U.S. Pat. Nos. 5,084,669, 5,070,303, and 5,048,059, which was re-issued as RE37,138.

The digital samples from downconverter 134 are applied to a demodulator 140 comprising a serial-to-parallel converter 142 and a transform unit, e.g., a DFT unit 144. Serial-to-parallel converter 142, which for example may comprise a DSP memory, assembles the input stream of digital samples into a parallel block of samples, one for each subcarrier frequency. DFT unit 144 frequency transforms the input block of digital samples to reconstruct estimates of the originally transmitted data and/or pilot signal values. It will be appreciated that DFT unit 144 implements the reverse or conjugate process of the IDFT unit 182 in transmitter 170. As in the case of the transmitter 170, it may be useful to oversample the downconverted signal in order to permit a relaxed specification for the signal selection filters. In any case, the output of DFT unit 144 comprises the same number of samples as the input block, which, with oversampling, is greater than J. Only J samples are used however, and the rest, which correspond to out-of-band spectral components not completely suppressed by the signal selection filters, are discarded. The output samples $\hat{S}_1 \ldots \hat{S}_J$ represent estimates of the samples input to the transmitter 160, with the addition of transmission noise and any distortion effects caused by the propagation channel. The output samples $\hat{S}_1 \ldots \hat{S}_J$ are applied to the signal processor 150 and/or channel processor 160. Signal processor 150 processes the sample estimates according to any known means to provide the corresponding information to the user. The channel processor 160 processes the sample estimates using any one of the embodiments described herein to determine scattering coefficients representative of the scattering objects in the wireless channel. The transceiver 100 may feedback the determined scattering coefficients to the remote transmitter, and/or may use the determined scattering coefficients to improve the accuracy and/or quality of the signals transmitted by transceiver 100, as described by the above-incorporated patent applications to the current applicant(s).

The simplified receiver 120 of FIG. 3 was deliberately illustrated in the same form as the simplified transmitter 170 of FIG. 2 to explain how the transmitter and receiver processes are essentially inverses of each other, with the result that estimates of the J complex samples $(S_1, \ldots, S_J)$ input to the transmitter 170 appear at the output of the receiver 120, effectively establishing J parallel channels of communication. These are normally employed to send digital information, using a suitable modulation constellation to map bit patterns to points in the complex I,Q plane. A practical OFDM transceiver 100 comprises many more details than shown in FIGS. 2 and 3, such as pulse shaping, cyclic prefixes, equalizers and such, which, although not essential to an understanding of the current invention, may be found in the following disclosures to current Applicant filed in the United States: U.S. patent application Ser. No. 12/126,576 titled "Communicating with root-Nyquist, self-transform pulse shapes" and filed 23 May 2008, U.S. patent application Ser.

No. 12/255,343 titled "Use of Pilot Code in OFDM and other non-CDMA systems" and filed 21 Oct. 2008, and U.S. patent application Ser. No. 12/045,157 titled "Compensation of Diagonal ISI in OFDM signals" and filed 10 Mar. 2008. The above applications are hereby incorporated by reference herein.

Using the channel processor 160 described herein, signals received from a remote transmitter, e.g., base station 60, are analyzed to produce a complex numerical value in each of a plurality of sub-channel bins for each OFDM block period. A system under international standardization for future cellular communications is known as LTE (Long Term Evolution), and uses 1200 subcarriers of 15 kHz spacing. Typically, the Fourier Transforms are over-dimensioned to 2048 point transforms, with 424 unused guard channels on either side of the 1200 used subcarriers.

In the LTE system, a number of OFDM symbol periods are grouped to form a "resource block" that occupies a certain amount of spectrum for a certain time. Within each resource block, certain subcarrier frequencies in certain OFDM symbol periods are allocated to carry known pilot symbols that can be used by receiver 120 to determine the channel characteristics, e.g., scattering coefficients. In any OFDM symbol period, the pilot symbols are equally spaced in frequency, but are frequency shifted for different OFDM symbol periods. This frequency shifting does not hinder the use of the improved Prony methods described in the incorporated applications to resolve the channel into a set of individual scattering objects in the Doppler-Delay domains. Joint estimation of a set of delays over many OFDM symbol periods can still be performed by compensating for the pilot symbol frequency shifts between OFDM symbol periods. Alternatively, two-dimensional interpolation between pilot symbols across the frequencies and times can first be carried out to obtain estimates of the channel for each subcarrier frequency and OFDM symbol period, which are then all input as data to the improved methods.

The method and apparatus described herein determines channel estimates for the same subcarrier frequencies for each OFDM symbol period, and therefore it will be assumed that these channel estimates are produced either by the two-dimensional interpolation method, or else by using the methods of the incorporated applications to obtain a first scattering-parameter-based channel model, which is then used to calculate the channel at all the subcarrier frequencies, or both. Furthermore, for OFDM symbol periods older than the current resource block, the data has already been decoded, and therefore all symbols in those OFDM periods are known, and so may be used together with the already-known pilot symbols to provide propagation channel coefficients representative of the channel phase and amplitude at all OFDM subcarrier frequencies. The description of the current invention may thus take these propagation channel coefficients as the starting point for performing a further refinement of the scattering-based channel model.

Figure 4:
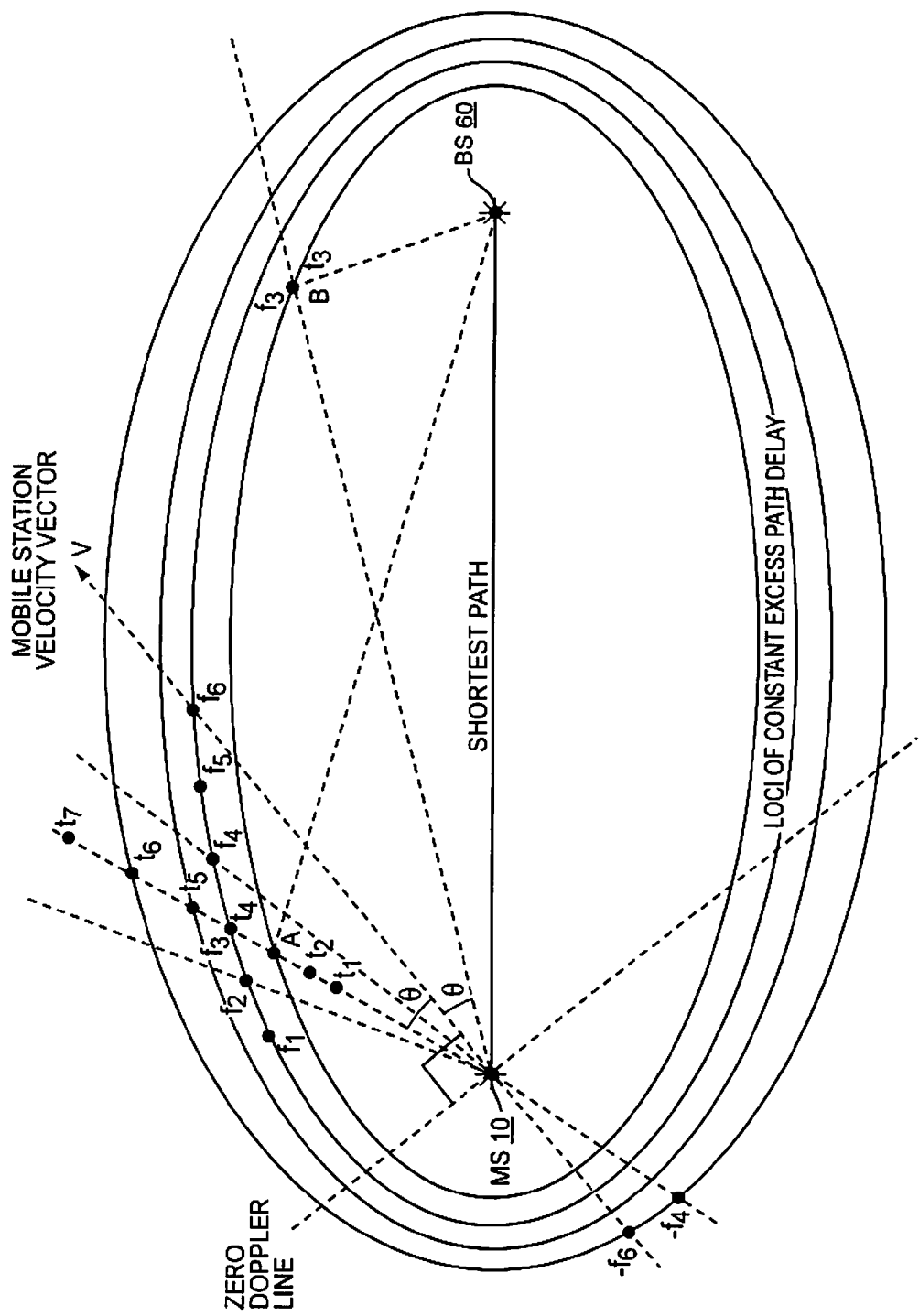
FIG. 4 shows the relationship between different scattering objects and different path delays relative to a transmitter and receiver in a wireless system.

FIG. 4 shows exemplary propagation geometry for the scattering objects that impact the propagation channel between a mobile station 10 and a base station 60. The locus of possible scattering objects that would have the same path delay with respect to the often non-existent, line-of-sight path, is an ellipse with the base station 60 at one focus and the mobile station 10 at the other focus. Different ellipses correspond to different path delays. The mobile station 10 is moving with a velocity indicated by the velocity vector V, which is not necessarily in the direction in which the base station 60 lies. The Doppler shift, or rate-of-change-of-delay of a scattering object depends on the bearing of the scattering object from the mobile station 10 relative to the velocity vector V. Thus, when the scattering object lies at an angle $\theta$ relative to the mobile velocity vector, the resolved velocity in the direction of the scattering object is $V \cos(\theta)$.

The rate-of-change-of-delay is thus determined by the cosine of the difference between the angle of arrival of the scattered wave and the direction of motion of the mobile station 10. It is a maximum when the mobile station 10 is headed directly towards the scattering object, and is zero when the angle of arrival is perpendicular to the direction of motion. Thus, it may be realized that Doppler shift, rate-of-change-of-delay, and angle of arrival are all just different representations of the same physical attribute of the scattering object, namely the angular part of its position coordinates relative to the mobile station 10.

Points designated $t_1, t_2, \ldots, t_7$ in FIG. 4 represent scattering objects at the same bearing, which therefore exhibit the same rate-of-change of delay, but which are located on different ellipses corresponding to different path delays. Points designated $f_1, f_2, \ldots, f_6$ are all on the same ellipse, and therefore exhibit the same excess path delay over the shortest path, but lie at different angles relative to the direction of motion, and so have different Doppler shifts or rate-of-change of delay values. A scattering object at $+\theta$ and another at $-\theta$ will have the same Doppler shift. If they also lie on the same path delay ellipse, they will be indistinguishable, momentarily at least. Therefore, there is a folding of scattering objects about the direction of motion, which we do not presently see any need to resolve. Scattering objects behind the mobile station 10 relative to its direction of motion will exhibit negative Doppler shifts, and so can be distinguished from scattering objects in front, even when they have the same path delay.

FIG. 4 shows a two dimensional diagram for simplicity, which relies on the assumption that everything lies in the same plane. In practice, however, the finite heights of scattering objects make the true iso-delay loci ellipsoids three dimensional, with the mobile station 10 and base station 60 still being the foci. All scattered waves may also get reflected from the ground, doubling the number of apparent scattering objects. However, such reflections will only be received (from a negative elevation angle) when there are no further objects blocking the path to the mobile station 10. Therefore, ground reflections are expected to arise only from scattering objects nearest the mobile station 10, and will be perceived as additional scattering objects with a slightly different path delay and almost the same Doppler shift.

The Doppler and delay domains therefore form a set of curvilinear coordinates in which scattering objects can be located, and their positions could, if desired, be transformed to true geographical coordinates. This would require knowledge of the mobile speed and direction and the location of the base station 60.

The present invention determines the complex scattering coefficients associated with one or more scattering objects in the wireless channel. Denoting A(n,m) as the scattering coefficient for a scattering object (m,n) having the $m^{th}$ path delay and the $n^{th}$ angle of arrival relative to the mobile station's direction of travel, $t_{mn}$ as the path delay for the $m^{th}$ scattering path delay and the $n^{th}$ angle of arrival, the channel coefficient C(k,i) at subcarrier k and OFDM symbol period i may be determined according to:

$$C(k, i) = \sum_n \sum_m A(n, m) e^{-j(\omega_0 + k\Delta\omega)(t_{mn} + i\varphi(n))}, \quad (1)$$

where $\Delta\omega$ represents the subcarrier spacing, $\phi(n)=(v/c)\cos(\theta(n))\Delta t$ represents the phase change per symbol period, $\Delta t$ represents the OFDM symbol period spacing, v represents the mobile speed, c represents the speed of light, $\theta(n)$ represents the angle of the $n^{th}$ angle of arrival relative to the mobile direction of motion, and $\omega_0$ represents the lowest subcarrier frequency (with the convention that k starts at zero). Alternatively, $\omega_0$ could represent the center frequency, and then k would range from negative to positive integers. Now defining:

$$B(n, k) = \sum_m A(n, m)e^{-j(\omega_0+k\Delta\omega)\tau_{mn}}, \quad (2)$$

we get:

$$C(k, i) = \sum_n B(n, k)e^{-j(\omega_0+k\Delta\omega)i\varphi(n)}. \quad (3)$$

Equation (3) could be solved for B(n,k), and thus for A(n,m), using the Prony method elaborated in the incorporated applications for any given k value to get a set of angle/Doppler related shifts $\phi(n)$ for that k-value. These Doppler shifts should be the same values, only scaled for frequency for different k. Thus, if the smallest Doppler shift found is $D_1$ for k=0, then the smallest Doppler found for other k-values should simply be:

$$\left(1 + \frac{k\Delta\omega}{\omega_0}\right)D_1. \quad (4)$$

Figure 5:
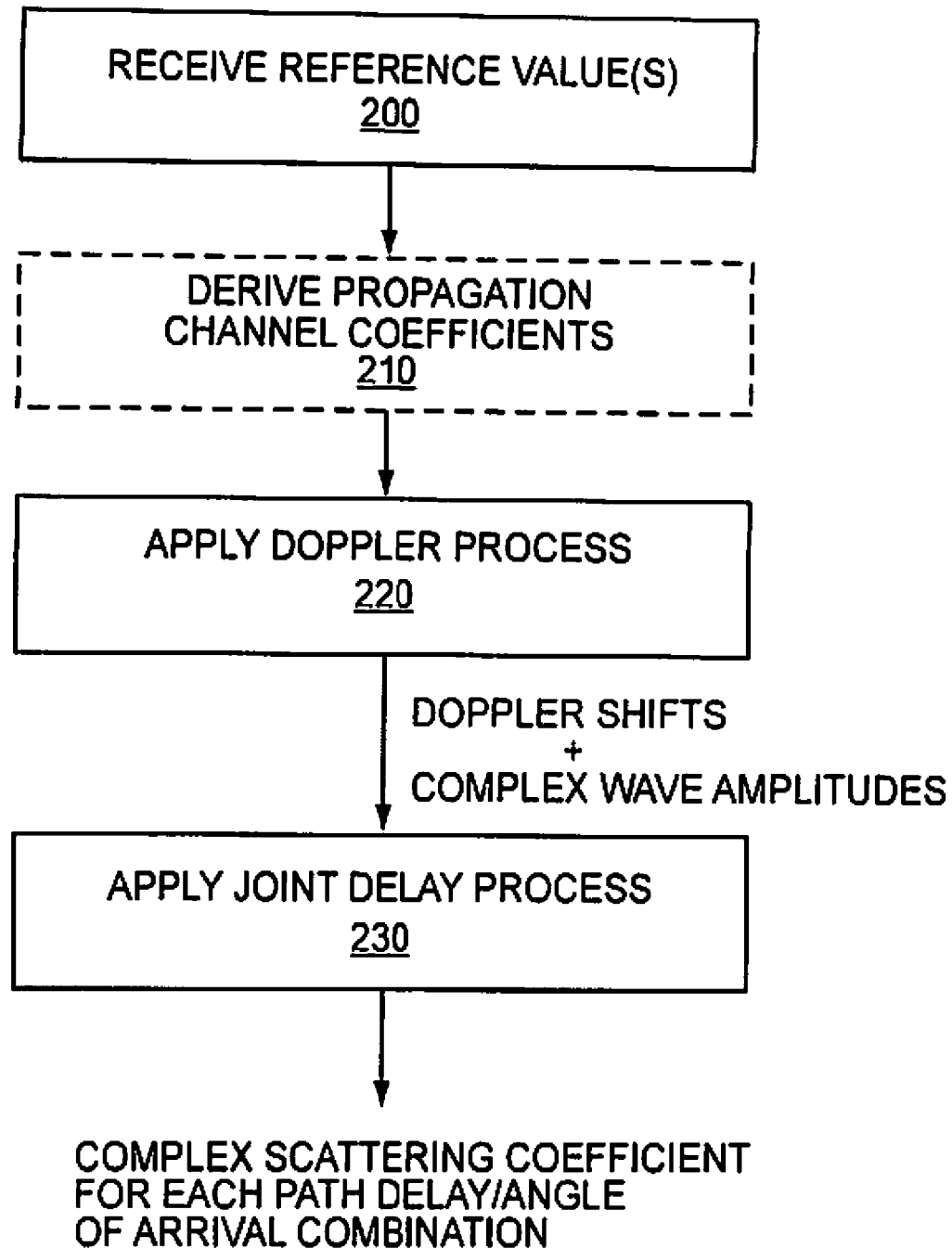
FIG. 5 shows a "Doppler-first" method according to one exemplary embodiment of the present invention.

Thus, in one exemplary embodiment of the present invention, the fact that the Doppler shift is not the same for all frequencies, but rather is proportional to absolute frequency, is handled by first performing a separate Doppler analysis for each frequency on the received reference values or the channel estimates derived therefrom, and then performing a delay analysis to determine the path delays and the corresponding scattering coefficients. FIG. 5 shows such a "Doppler-first" process for determining the Doppler shifts and the corresponding complex scattering coefficients. Receiver 120 receives reference signals, e.g., pilot signals, for multiple frequencies in the received signal bandwidth during time interval (i), for example during an OFDM symbol period, and the signal samples are committed to memory (block 200). While not required, some embodiments may process the received reference signals to determine the channel frequency response at a number of frequencies in the received signal bandwidth (block 210). For example, received reference signals of an OFDM symbol period are submitted to a DFT 144 to get subcarrier values, known symbol modulation is removed, and the complex propagation channel coefficients obtained therefrom may be processed in channel processor 160 with those of other OFDM symbol periods to provide a smoothed estimate of the complex propagation channel coefficient at each of a number of OFDM subcarrier frequencies.

A Doppler process is independently applied to the received reference signals or the complex propagation channel coefficients derived therefrom at the same frequency but from current and past signal intervals (e.g. OFDM symbol periods) to obtain a set of Doppler shifts and a corresponding set of complex wave amplitudes (e.g., Doppler coefficients) for each frequency (block 220). For example, the values for each OFDM symbol period corresponding to the same subcarrier frequency are subject to a Prony analysis to determine the Doppler shifts and the corresponding Doppler coefficients, where each Doppler shift corresponds to a different angle of arrival. A delay process is jointly applied to the Doppler coefficients for corresponding Doppler shifts on the different frequencies to yield a set of path delays for each Doppler shift and the associated scattering coefficients for each path delay/angle of arrival combination (block 230). Choosing Doppler coefficients associated with corresponding Doppler shifts on all the frequencies is in effect selecting scattering objects that lie at a particular angle of arrival relative to the motion of the mobile station 10. Applying a delay process, e.g., an Inverse Prony process, across the frequency domain for these Doppler coefficients then yields the path delays of the scattering objects at that angle, along with their associated scattering coefficients. The now identified individual scattering parameters, which include the scattering coefficient and the corresponding angle of arrival and path delay for each scattering object, may be used to estimate the channel complex frequency response at any desired time and frequency, for example, at the subcarrier frequencies to be used for transmission in the next OFDM symbol period. For example, scattering coefficients associated with weak scattering objects may be de-weighted relative to the scattering coefficients associated with strong scattering objects to generate smoothed channel estimates for at least one frequency and time.

Figure 6:
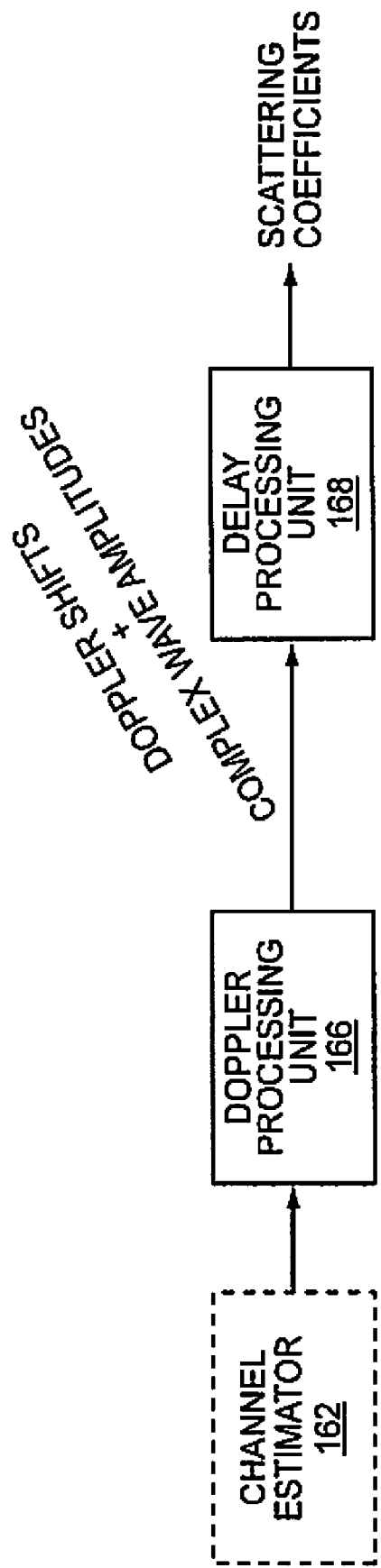
FIG. 6 shows a block diagram of one channel estimation device configured to implement the method of FIG. 5.

FIG. 6 shows a block diagram of an exemplary channel processor 160 used to implement the process of FIG. 5. Processor 160 includes an optional channel estimator 162, a Doppler processing unit 166, and a delay processing unit 168. It will be appreciated that while each of these elements is shown as separate entities within the channel processor 160, two or more of these functions may be implemented using one or more processors.

When utilized, the channel estimator 162 generates complex propagation channel coefficients based on the input reference signals, e.g., pilot signals, according to any known process. Doppler processing unit 164 independently processes the input values (e.g., pilot signals or propagation channel coefficients derived therefrom), e.g., with a Prony algorithm, for each frequency across a set of symbol times of a total analysis interval to determine a set of Doppler shifts and a corresponding set of complex wave amplitudes (e.g., Doppler coefficients) for each frequency. Delay processing unit 166 jointly processes the values output by Doppler processing unit 164, e.g., with a joint inverse Prony algorithm, for each Doppler shift across all frequencies to determine the set of path delays for each Doppler shift and the associated scattering coefficients. As discussed above, any channel estimates derived from the scattering coefficients may be smoothed over time.

Block 230 in FIG. 5 requires corresponding Doppler shifts to be identified on each reference signal frequency. If the Doppler shift found on $\omega_0$ is $D_1$, then the corresponding Doppler shift at frequency $\omega_0+kd\omega$ should be given by Equation (4). If the expected value is not found due to noise or numerical accuracy, then a correspondence could be made by assuming that the highest Doppler found in each case was a corresponding Doppler, and likewise for the lowest Doppler found, and that those in between would then correspond likewise.

Simulations using artificial, computer-created scattering object environments did indeed produce this expected correspondence. However, the situation should be anticipated where, due to noise, the lowest amplitude Doppler $D_1$ that would be found for subcarrier k=0 in real life might not be found at all for some other k, at which frequency the smallest Doppler found might correspond to a different scattering object having an adjacent Doppler shift. There is therefore a question of how, in general, one can safely make a correspondence between a Doppler shift found for one k value and a Doppler shift found for another k value, and conclude that they arise from the same scattering object. This issue of matching up Doppler shifts arises because the Doppler analyses are done independently for each subcarrier frequency. The Doppler analysis has to be performed independently for each frequency in the prior art, because the values are not exactly the same for all frequencies.

In some embodiments, re-sampling by interpolation may be used to overcome this matching issue. In these embodiments, interpolation enables the estimation a single set of frequency-normalized Doppler shifts (e.g., scattering object angles, or rate-of-change-of-delay values) common to all frequencies k, and therefore, enables the Doppler and/or delay processes to be done jointly rather than independently.

First, observe that the set of given channel coefficients C(k,i) comprise sets of samples of the channel at frequency k for sample times $i=t_0, t_0-\Delta t, t_0-2\Delta t, \ldots$, where $t_0$ represents the time of the reception of the most recent OFDM symbol. Re-sampling by interpolation the set of reference signals or channel coefficients derived therefrom for frequency k, produces a set of interpolated values at re-sampled times that are scaled in proportion to the absolute frequency $\omega_0+k\Delta\omega$. That is, the re-sampled times for the interpolated values at frequency k will be:

$$t_0, t_0 - \frac{\Delta t}{1 + \frac{k\Delta\omega}{\omega_0}},$$

$$t_0 - \frac{2\Delta t}{1 + \frac{k\Delta\omega}{\omega_0}}, \ldots \quad (5)$$

In Equation (5) it is assumed that the information received during the most recent symbol period (e.g., time $t_0$) is un-interpolated, and that interpolation is only applied to the reference signals/channel coefficients from past symbol periods within the total analysis interval. This is because it is assumed that we do not have the luxury of future values to assist in estimating current values; that would imply a latency that is not normally desired, unless there was an interest in knowing what the channel was retrospectively. The latter can arise, for example, if scattering parameters are used to estimate a mobile location. However, if scattering parameters are used for estimating a transmit channel before transmission occurs, then retrospective values are not useful.

The effect of re-sampling is that the Doppler shifts found by applying the Doppler process to the interpolated values are frequency-scaled values of the true Doppler shifts, where each frequency-scaled Doppler shift is identical for every subcarrier k associated with a particular time i. In fact, the frequency-scaled Doppler shifts now represent rate-of-change-of-delay values, which are independent of frequency, and which allow the frequency-independent rate-of-change of delay spectrum to be determined rather than the frequency-dependent Doppler spectrum. The frequency-scaled Doppler shifts can thus be calculated jointly over all frequencies k by, for example, using the joint Prony process described in the incorporated applications. Apart from solving the problem of correspondence or matching up of Doppler shifts found by analyzing channels on different frequencies independently, there is a great advantage to jointly determining the same Doppler shifts over several hundred frequencies, namely, a noise reduction due to the averaging effect.

Figure 7:
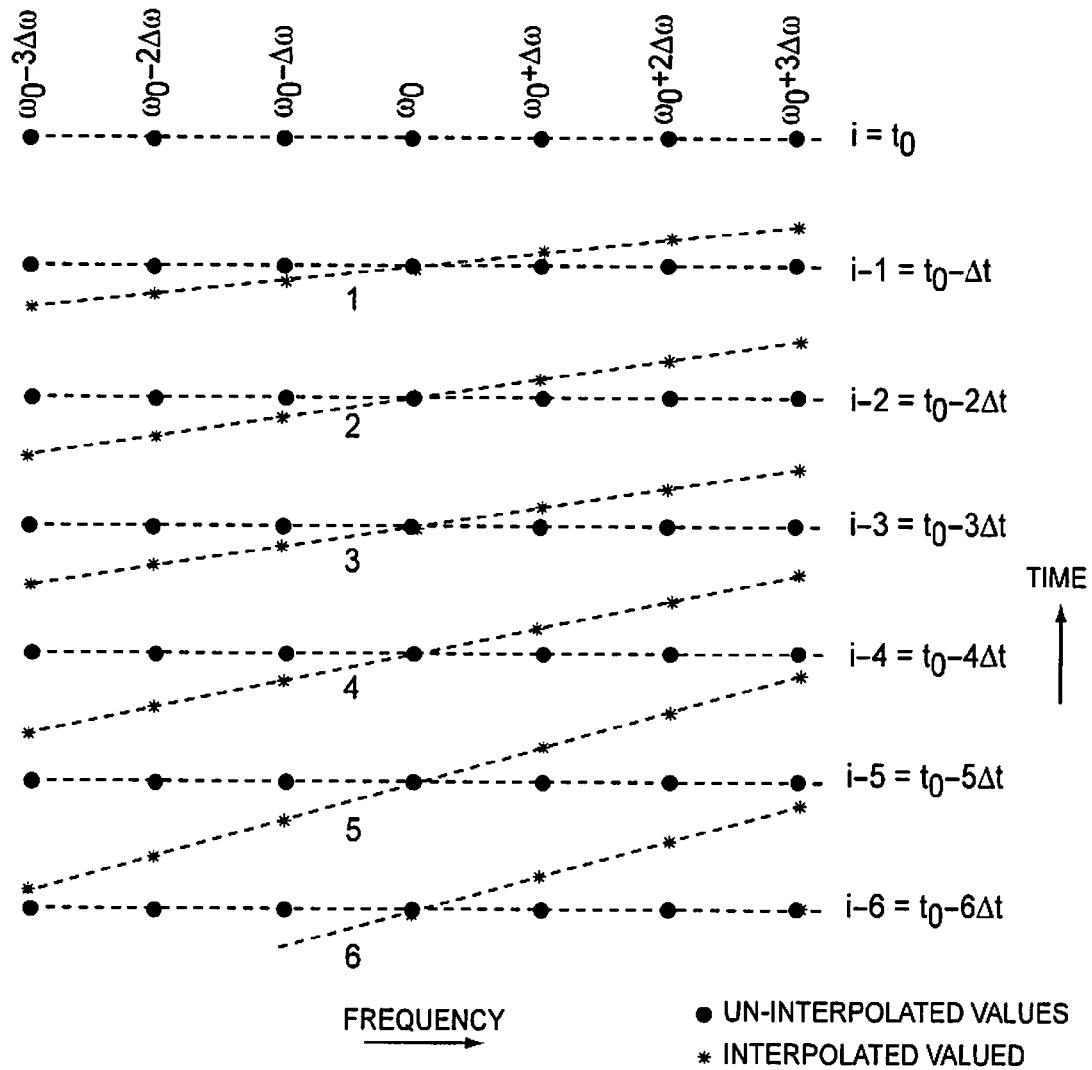
FIG. 7 illustrates the effects of re-sampling according to one exemplary embodiment of the present invention.

FIG. 7 illustrates the re-sampling process, where time increases from bottom to top and frequency increases from left to right. The most recent OFDM symbol period ($i=t_0$) is at the top, with earlier symbol periods successively below it. Further, the center frequency $\omega_0$ is shown in the center, with frequencies to the left successively reducing by a frequency spacing $\Delta\omega$, and frequencies to the right successively increasing by $\Delta\omega$. The channel coefficients for frequencies lower than $\omega_0$ are interpolated at proportionally greater time spacings than the symbol period, and the channel coefficients for frequencies higher than $\omega_0$ are interpolated with proportionally smaller time spacings than the symbol period. In this example, the channel coefficients are not interpolated for the most recent symbol period ($i=t_0$), for the reasons of latency outlined above. The time spacing for the center frequency $\omega_0$ is in this example is left unchanged. It will be appreciated, however, that the present invention does not prevent the most recent value or the center frequency value from being interpolated, and does not require the illustrated frequency convention. Further, while the following describes interpolating the propagation channel coefficients, it will be appreciated that the same re-sampling/interpolation process may be applied directly to the received pilot signals.

In general, linear interpolation will provide sufficient accuracy for the purposes herein. Any method of interpolation, however, may be used. Thus, if we have channel coefficients at times $i=t_0, t_0-\Delta t, t_0-2\Delta t, \ldots$ for frequency $\omega_0-k\Delta\omega$, then we wish to interpolate to calculate channel coefficients at re-sampled times $i'=t_0, t_0-\Delta t\omega_0/(\omega_0-k\Delta\omega), t_0-2\Delta t\omega_0/(\omega_0-k\Delta\omega), \ldots$.

If time $t_0-n\Delta t\omega_0(\omega_0-k\Delta\omega)$ lies between two symbol periods, at which times the un-interpolated channel coefficients are C(k,-i) and C(k,-i-1), then the interpolated value is given by:

$$C'(k, i') = C(k, -i) - \frac{(C(k, -i-1) - C(k, -i))kn\Delta\omega}{\omega_0 - k\Delta\omega}, \quad (6)$$

which reduces to the un-interpolated input channel coefficient if either k=0 (e.g., frequency is $\omega_0$) or i=0 (the current symbol period).

Thus, calling the interpolated values C'(k,i') at re-sampled times i', we have:

$$C'(k, i') = \sum_n B(n, k) e^{-j\omega_0 \varphi(n) i'} \quad (7)$$

or $$C'(k, i') = \sum_n B(n, k) Z_n^{i'}, \quad (8)$$

where $Z_n = e^{-j\omega_0\phi(n)}$. Thus, the $Z_n$ values, now common for all k, are found by using the improved Prony methods of the incorporated applications jointly over all k. The suggested method is that which constrains the $Z_n$ to lie on the unit circle, so that their complex logarithms are purely imaginary and equal to $-j\omega_0\phi(n)$, from which $\phi(n)$ are found directly. This assumes that scattered waves only change in phase over the short term due to mobile motion, and do not change in amplitude. If desired, the $Z_n$ values may be allowed to be complex, corresponding to assuming the amplitude may be rising or falling exponentially. However, the assumption that all scattering objects within the same angular division, however distant, would have the same exponential amplitude change due to the distance changing does not seem to correspond with reality. Therefore, constraining $Z_n$ to lie on the unit circle, which corresponds to an amplitude that does change over as short a period as 40 ms, seems appropriate.

The jointly-determined $Z_n$ may now be substituted into Equation (3) to find the B(n,k) from:

$$B(n,k)=[Z_k^{\#}Z_k]^{-1}Z_k^{\#}C(k), \quad (9)$$

where $Z_k$ represents a matrix with elements $z_k(i,n)=e^{j(\omega_0+k\Delta\omega)\phi(n)i\Delta t}$ and C(k) represents a column vector of the values C(k,i) for all i and a given k. We have above deliberately chosen to find the B(n,k) using the un-interpolated values of C(k,i), but it would also be possible to use the interpolated values. Since it is not necessary to use interpolated values however, it seems best to fit the B(n,k) coefficients as far as possible to raw, unadulterated measurements. It could thus even be considered to use pilot symbol values directly in place of the channel coefficients estimated from pilot values by a channel estimation algorithm, when determining the values B(n,k).

Now knowing B(n,k), we can solve Equation (2) by the improved Prony method separately for each n to find the values of $t_{mn}$ to determine the path delays for a set of scattering objects with different path delays that are distributed along each of the n angular divisions. In effect, this method can be regarded as determining a scattering object distribution in polar coordinates, where their angles are first quantized to one of a number of angular divisions, which are not however constrained to be regularly spaced in angle, but are determined by the method, while the radial distributions of scattering objects along each angular division are not quantized to any particular grid, and are determined independently for each angular division. Once the $r_{mn}$ values are known, the complex amplitude A(n,m) associated with each of the m scattering paths and the n angular divisions may be determined by inverting Equation (2).

Figure 8:
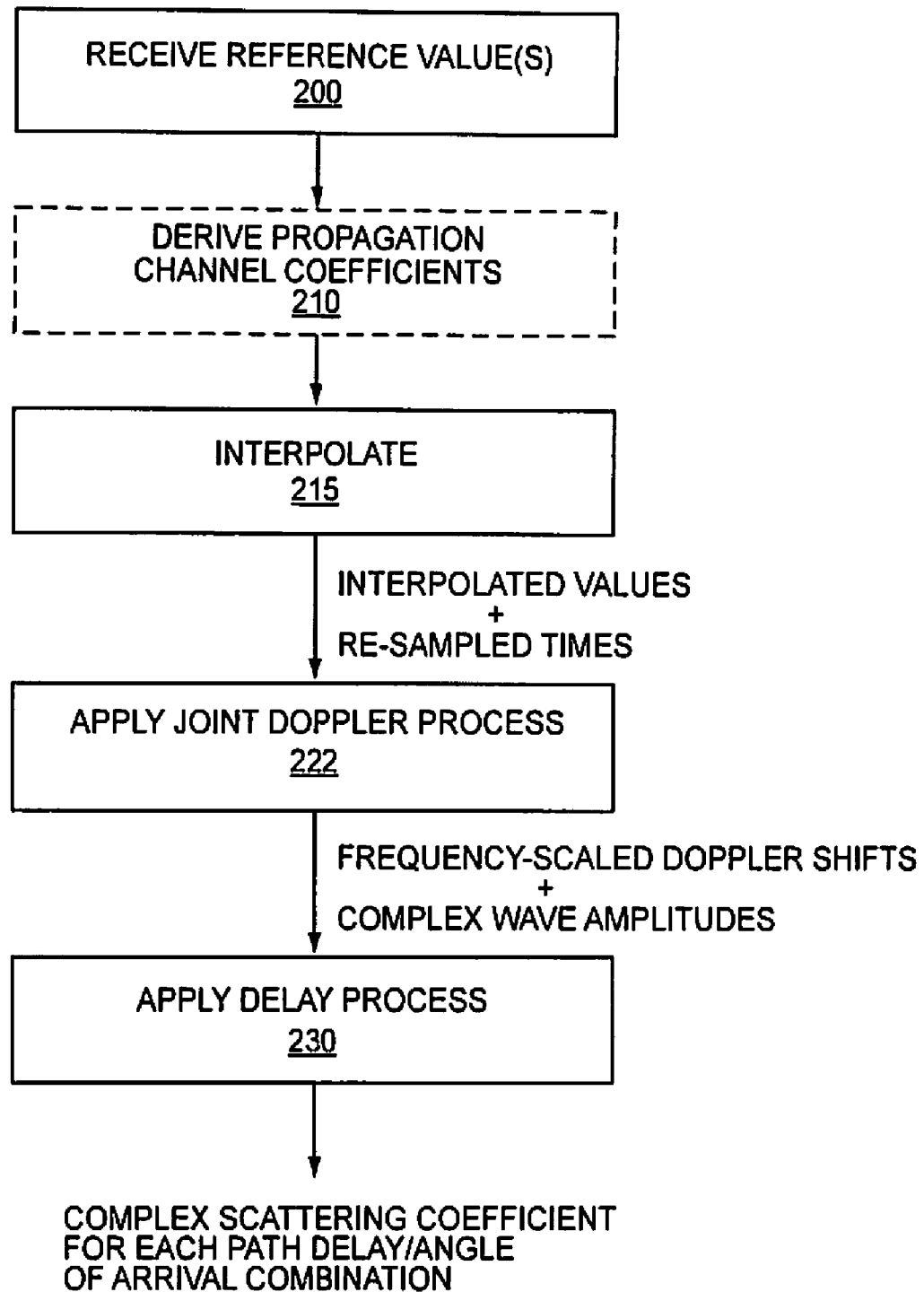
FIG. 8 shows a "Doppler-first" method as applied to interpolated values according to one exemplary embodiment of the present invention.

FIG. 8 shows a flow chart for another Doppler-first method that includes the above-described interpolation. Receiver 120 receives reference signals, e.g., pilot signals, for multiple frequencies in the received signal bandwidth during time interval (i), for example during an OFDM symbol period, and the signal samples committed to memory (block 200). While not required, some embodiments may process the received reference signals to determine the propagation channel coefficients at a number of predetermined frequencies (block 210). The received pilot signals or the channel coefficients derived therefrom are re-sampled by interpolation to obtain interpolated values with a re-sampled time spacing inversely proportional to the frequency to which they pertain (block 215). As a result, the product of the re-sampled time spacing and the corresponding frequency for each interpolated value is constant for all frequencies. A joint Doppler process is applied to the interpolated values at the same frequency but from current and past re-sampled times within the total analysis interval to obtain a single set of frequency-scaled Doppler shifts and the corresponding sets of complex wave amplitudes (e.g., Doppler coefficients), where the set of frequency-scaled Doppler shifts is common for all subcarrier frequencies (block 222). For example, the interpolated values for the re-sampled times are subject to a joint Prony analysis to determine the frequency-scaled Doppler shifts and the corresponding Doppler coefficients. These frequency-scaled Doppler shifts are in fact rate-of-change-of-delay values, and are related to corresponding angles of arrival of scattered waves. It is no longer necessary to identify "corresponding Doppler shifts," as each frequency has the same set of frequency-scaled Doppler shifts or rate-of-change-of-delay values. Thus, the delay process is subsequently applied to the Doppler coefficients over all frequencies for each rate-of-change-of-delay in order to resolve the scattering objects by path delay at each angle of arrival, and to compute their corresponding scattering coefficients (block 230). The delay process may be performed, for example, by applying the inverse Prony algorithm disclosed in the herein incorporated applications to the Doppler coefficients. The now identified individual scattering parameters, which include the scattering coefficient and the corresponding angle of arrival and path delay for each scattering object may be used to estimate the complex channel frequency response at any desired time and frequency, e.g., at the subcarrier frequencies to be used for transmitting in the next transmission period, as described herein.

Figure 9:
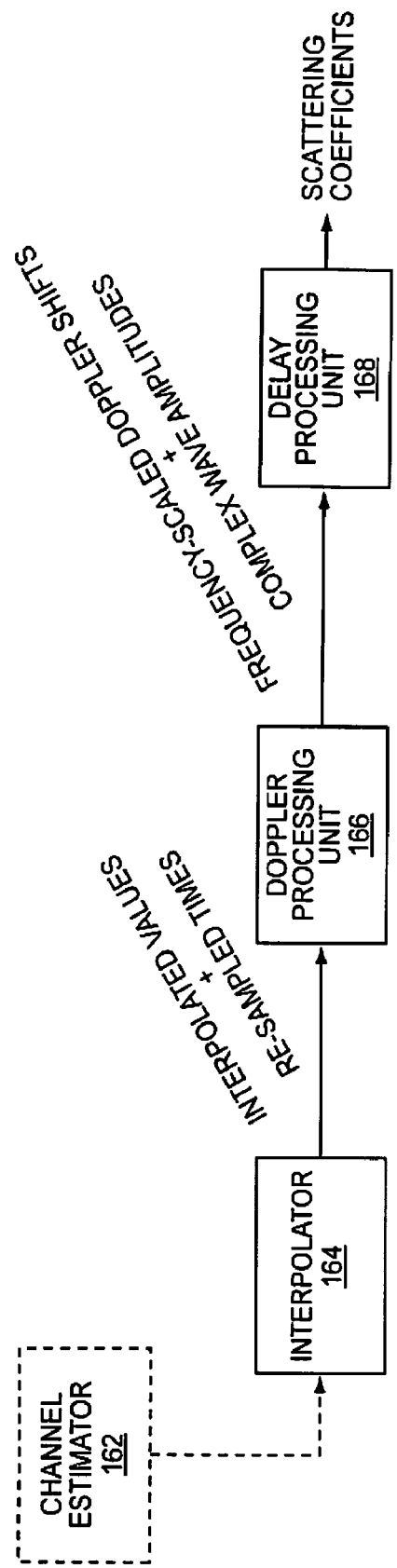
FIG. 9 shows a block diagram of another channel estimation device configured to implement the method of FIG. 8.

FIG. 9 shows a block diagram of an exemplary channel processor 160 used to implement the process of FIG. 8. Processor 160 includes an optional channel estimator 162, an interpolator 164, a Doppler processing unit 166, and a delay processing unit 168. It will be appreciated that while each of these elements is shown as separate entities within the channel processor 160, they may be implemented as one or more processing functions within one or more processors.

When utilized, the channel estimator 162 generates complex propagation channel coefficients based on the input reference signals, e.g., pilot signals. Interpolator 164 re-samples by interpolation the received pilot signals or the channel coefficients derived therefrom over the total analysis interval to obtain interpolated values having a re-sampled time spacing inversely proportional to the corresponding frequency. Doppler processing unit 166 jointly processes the interpolated values, e.g., with a joint Prony algorithm, for all associated frequencies across the set of corresponding re-sampled times to determine the set of frequency-scaled Doppler shifts common for all frequencies, and a corresponding set of complex wave amplitudes (e.g., Doppler coefficients) for each frequency. As noted above, the frequency-scaled Doppler shifts are in fact rate-of-change-of-delay values, and are related to corresponding angles of arrival of scattered waves. Delay processing unit 168 processes the values output by Doppler processing unit 164, e.g., with an inverse Prony algorithm, for each rate-of-change-of-delay value across all frequencies to determine a set of path delays for each Doppler shift and the associated scattering coefficients. As discussed above, any channel estimates subsequently derived from the scattering coefficients may be smoothed over time. For example, scattering coefficients associated with weak scattering objects may be de-weighted relative to the scattering coefficients associated with strong scattering objects to generate smoothed channel estimates for at least one frequency and time.

In principle, the total analysis interval (e.g., the number of OFDM symbol periods over which the channel is analyzed to determine the scattering parameters) is not limited. However, constraining the interpolated values $Z_n$ to the unit circle assumes no amplitude change due to the distance change between the mobile station 10 and the scattering object over the analysis interval. At 60 MPH, or approximately 30 m/s, there can be a distance change of 2 m to a scattering object in 1000, 66 μs OFDM symbol periods, which may be ignored if the scattering object is 200 m distant, but possibly not if it is only 20 m distant.

Another limitation on the length of the total analysis interval is the second derivative of phase, or rate-of-change of Doppler. At 30 m/s and 2 GHz, the maximum Doppler lies between +/−200 Hz and the maximum rate of change occurs when a scattering object is broadside the mobile station 10, and is equal to 600 Hz/s for a scattering object 10 m away at closest approach. By analyzing 1000 OFDM symbol periods, e.g., a total of 66 ms, a 15 Hz resolution can be obtained. However, the change in the Doppler shift over 66 ms is greater than that, e.g., is closer to 40 Hz. The maximum Doppler shift resolution that can be attempted without a second order correction is thus of the order of the square root of the second order phase derivative, e.g., $\sqrt{600}=-25$ Hz, or about 16 frequency bins between −200 and +200 Hz, with the above assumption of a closest scattering object distance of 10 m. The number of bins is independent of speed, but the frequency resolution of the bins will change with speed. The Prony algorithm determines the bin frequencies automatically, and it is only necessary to ensure that the length of the total analysis interval is sufficient to provide the desired resolution at low speeds. The Prony algorithm can actually achieve hyper-resolution. That is it can resolve frequencies closer than the reciprocal of the total analysis interval, so the number of Doppler shifts found can possibly exceed 16.

A total analysis interval of 600 OFDM symbols, e.g., 40 ms, represents a possible maximum when the mobile station 10 is traveling at 60 MPH, and has in principle sufficient excess of information to resolve 16 Doppler shifts at lower speeds too, by the hyper-resolution property, but the total analysis interval may need to be lengthened for walking speeds. In general, this invention is envisaged for vehicular speeds and relatively static scattering objects, and other solutions are required for static terminals where movement of the surrounding environment can dominate channel variation. At slow speeds or static however, some of the other prior art ideas such as channel feedback from receiver to transmitter may be more practically possible.

Thus, it has been estimated that the number of angular divisions sought to be resolved by applying a joint Prony algorithm to Equation (8) is about 16. The index n then ranges from say 0 to 15 and k ranges from 0 to 1199. Thus, 16×1200=19,200 values B(n,k) are found. For each angular division n, the 1200 values B(n,k=0,1199) are now used in Equation (2) to perform an Inverse Prony algorithm to yield the $t_{mn}$. The 1200 frequency values, spanning 18 MHz, are sufficient to resolve 600 path delays, as close as 50 ns or less, along each of the 16 angular directions; however, a lot fewer can suffice. If only 12 path delays were resolved along each angular direction, a total of 192 scattering objects would be resolved. We thus realize a significant advantage of this inventive method: A large number of scattering objects are resolved using a number of instances of Prony algorithms of small size. This process is much more amenable to implementation and avoids the need to perform matrix algebra on large matrices. The above invention therefore exhibits two new advantages of particular importance:

By first partitioning the scattering objects into Doppler bands, the number of scattering objects in each Doppler band has been reduced so that a small inverse Prony-type algorithm suffices to resolve their delays.

The approximation error associated with ignoring the small variation of Doppler shifts across the OFDM bandwidth has been eliminated.

Once A(n,m) and $t_{mn}$ are known, Equation (1) may be applied to find c(k,0) at time i=0 for any frequency $\omega_0+k\Delta\omega$, where k does not have to be an integer. Thus, the channel may now be estimated with a high level of accuracy for a frequency other than those on which signal reception occurred. Because the rate-of-change-of-delay values ω(n) are also known, the channel can also be extrapolated forward in time by iΔt to compute C(k,i) for a different frequency and future time, for example, a forthcoming transmit frequency and time.

A process of even lower complexity can sometimes be used when the number of significant scattering objects is less than already resolved by the 16 Doppler bins. It may then be necessary to find only one path delay in some angular divisions, in which case an inverse Prony algorithm for finding each path delay $t_n$ can reduce to the following simple formula:

$$t_n = \frac{1}{d\omega}\arg\left[\sum_k B(n,k)B^*(n,k+1)\right], \quad (10)$$

which is analogous to a frequency discriminator for determining a rate of change of phase.

If the Bresler-Macowski refinement to the inverse Prony algorithm is included, an improved estimator for a single path delay is obtained. The path delay t is that which minimizes:

$$\epsilon^2 = (a^*,-a)[B_n]^\#[G^\#G]^{-1}[B_n](a^*,-a)^\#, \quad (11)$$

where $a=e^{-j\Delta\omega t/2}$ with the convention that a path delay is a positive value of t. The matrix $[B_n]$ is given by:

$$[B_n] = \begin{bmatrix} B(n,1) & B(n,2) \\ B(n,2) & B(n,3) \\ B(n,3) & B(n,4) \\ \vdots & \vdots \\ B(n,N-1) & B(n,N) \end{bmatrix} \quad (12)$$

and the [G] matrix is given by:

$$G = \begin{bmatrix} a^* & 0 & 0 & \cdots & \cdots & 0 \\ -a & a^* & 0 & \ddots & \ddots & \vdots \\ 0 & -a & a^* & \ddots & \ddots & \vdots \\ 0 & 0 & -a & \ddots & \ddots & \vdots \\ 0 & 0 & 0 & \ddots & \ddots & \vdots \\ \vdots & 0 & 0 & \ddots & \ddots & 0 \\ \vdots & \vdots & 0 & \ddots & a^* & 0 \\ 0 & \cdots & \cdots & \cdots & -a & a^* \end{bmatrix} \quad (13)$$

For this simple, single-delay case, the matrix $[G^\#G]$ has the following decomposition:

$$[G^\#G] = \begin{bmatrix} 2 & e^{-j\omega t} & 0 & 0 & 0 & \ldots & \ldots & 0 \\ e^{j\omega t} & 2 & e^{-j\omega t} & 0 & 0 & \ldots & \ldots & 0 \\ 0 & e^{j\omega t} & 2 & e^{-j\omega t} & 0 & 0 & \ldots & 0 \\ \vdots & & \ddots & \ddots & \ddots & \ddots & \ddots & \vdots \\ \vdots & & & \ddots & \ddots & \ddots & \ddots & 0 \\ \vdots & & & & \ddots & \ddots & \ddots & e^{-j\omega t} \\ 0 & \ldots & \ldots & \ldots & \ldots & 0 & e^{j\omega t} & 2 \end{bmatrix} \quad (14)$$

$$= 2 \begin{bmatrix} 1 & & & & & \\ & e^{j\omega t} & & & & 0 \\ & & e^{j2\omega t} & & & \\ & & & e^{j3\omega t} & & \\ & 0 & & & \ddots & \\ & & & & & e^{j(N-1)\omega t} \end{bmatrix} H \begin{bmatrix} 1 & & & & & \\ & e^{-j\omega t} & & & & 0 \\ & & e^{-j2\omega t} & & & \\ & & & e^{-j3\omega t} & & \\ & 0 & & & \ddots & \\ & & & & & e^{-j(N-1)\omega t} \end{bmatrix}$$

where $$H = \begin{bmatrix} 1 & -0.5 & 0 & 0 & 0 & \ldots & \ldots & \ldots & 0 \\ -0.5 & 1 & -0.5 & 0 & 0 & 0 & \ldots & & 0 \\ 0 & -0.5 & 1 & -0.5 & 0 & 0 & & \ldots & 0 \\ \vdots & & \ddots & \ddots & \ddots & & & & \vdots \\ \vdots & & & \ddots & \ddots & \ddots & & & \vdots \\ \vdots & & & & \ddots & \ddots & \ddots & & \vdots \\ \vdots & & & & & \ddots & \ddots & \ddots & 0 \\ 0 & & & & & & -0.5 & 1 & -0.5 \\ 0 & \ldots & \ldots & \ldots & \ldots & \ldots & & -0.5 & 1 \end{bmatrix} \quad (15)$$

where t in Equation (14) equals $t_n$. The matrix H is of size $N-1 \times N-1$ and has the explicit inverse defined by:

For i greater than or equal to $(N-1)/2$: $H^{-1}(i,j)=H^{-1}(N-i, N-j)$, e.g., the last half of the rows are the first half of the rows written backwards;

For i less or equal to $(N-1)/2$:
  For j greater or equal to i: $H^{-1}(i,j)=2(i-ij/N)$
  For i greater or equal to j: $H^{-1}(i,j)=2(j-ij/N)$ An example of a 7×7 $H^{-1}$ for N=8 is given by:

$$H^{-1} = \begin{bmatrix} 1.75 & 1.50 & 1.25 & 1.00 & 0.75 & 0.50 & 0.25 \\ 1.50 & 3.00 & 2.50 & 2.00 & 1.50 & 1.00 & 0.50 \\ 1.25 & 2.50 & 3.75 & 3.00 & 2.25 & 1.50 & 0.75 \\ 1.00 & 2.00 & 3.00 & 4.00 & 3.00 & 2.00 & 1.00 \\ 0.75 & 1.50 & 2.25 & 3.00 & 3.75 & 2.50 & 1.25 \\ 0.50 & 1.00 & 1.50 & 2.00 & 2.50 & 3.00 & 1.50 \\ 0.25 & 0.50 & 0.75 & 1.00 & 1.25 & 1.50 & 1.75 \end{bmatrix} \quad (16)$$

Thus minimizing $\epsilon^2$ is done by the following steps:
  (i) Get an initial value for $t_n$ using Equation (10) and the analysis preceding Equation (10).
  (ii) Compute $\alpha = e^{j\Delta\omega t_n}$.
  (iii) Untwist the values of the $B_n$ matrix $B_n(1) \ldots B_n(N)$ through angles given by successive powers of $\alpha$ to get untwisted values $B'_n(1) \ldots B'_n(N)$ given by $B'_n(k) = B_n(k)\alpha^{k-1}$, which then form a corresponding $B'_n$ matrix. This step applies the diagonal matrices of Equation (14) to the values of the $B_n$ matrix, leaving only the H matrix to be multiplied.
  (iv) Calculate the 2×2 matrix $D = B'_n{}^\# H^{-1} B'_n$. This calculation may use the explicit formula given above for the elements of the inverse of H, so no actual inversion or even storage of H is needed.
  (v) Calculate the eigenvector E corresponding to the smallest eigenvalue of the 2×2 matrix D, constraining the eigenvector's two elements to be negative complex conjugates of each other, and calculate the angle (argument) of the square root of minus the ratio of the eigenvector's two elements. This turns out to be simply the argument of the $d_{12}$ element of the 2×2 matrix D calculated in step (iv), e.g., $\Delta\theta = \arg\{d_{12}\}$.
  (vi) Calculate a refined value of $t_n$ from $t_n - \Delta\theta/\Delta\omega$
  (vii) Iterate from step (iii) until convergence.

The above algorithm is analogous to a form of frequency discriminator called a threshold-extension demodulator, of the type known as a dynamic tracking filter.

Steps (i) to (vii) may be used when there is only one scattering object and thus one path delay to be found for a given Doppler or azimuthal angular division. When the number of path delays to be found for any azimuthal angle, say the $n^{th}$ angular division, is more than one, say M, then the inverse, improved Prony method of the incorporated applications is used to process the values $B(n,1) \ldots B(n,N)$ to obtain M path delays $t_{mn}$, m=1 to M, for angular division n.

There is no constraint to find the same number of scattering objects in each azimuthal angular division, e.g., m can be different for different values of n. It might be sufficient to find one scattering object at some angles, while finding multiple scattering objects at other angles. The number of scattering objects characterized, M(n), can be determined from how residual error reduces as the number of scattering objects resolved is increased. It has been observed that the residual error reduces rapidly at first, when presumably real scattering objects with significant signal strengths are being resolved, but then with further increase in the number of resolved scattering objects above some threshold, the rate of error reduction becomes slower, presumably because now only noise remains. The point of transition in residual error slope from steep to shallow is indicative of the number of scattering objects to resolve. This does not need to be determined often, as the number of scattering objects can be fixed for much longer periods than 600 OFDM symbol periods, which is only 40 ms.

Figure 10:
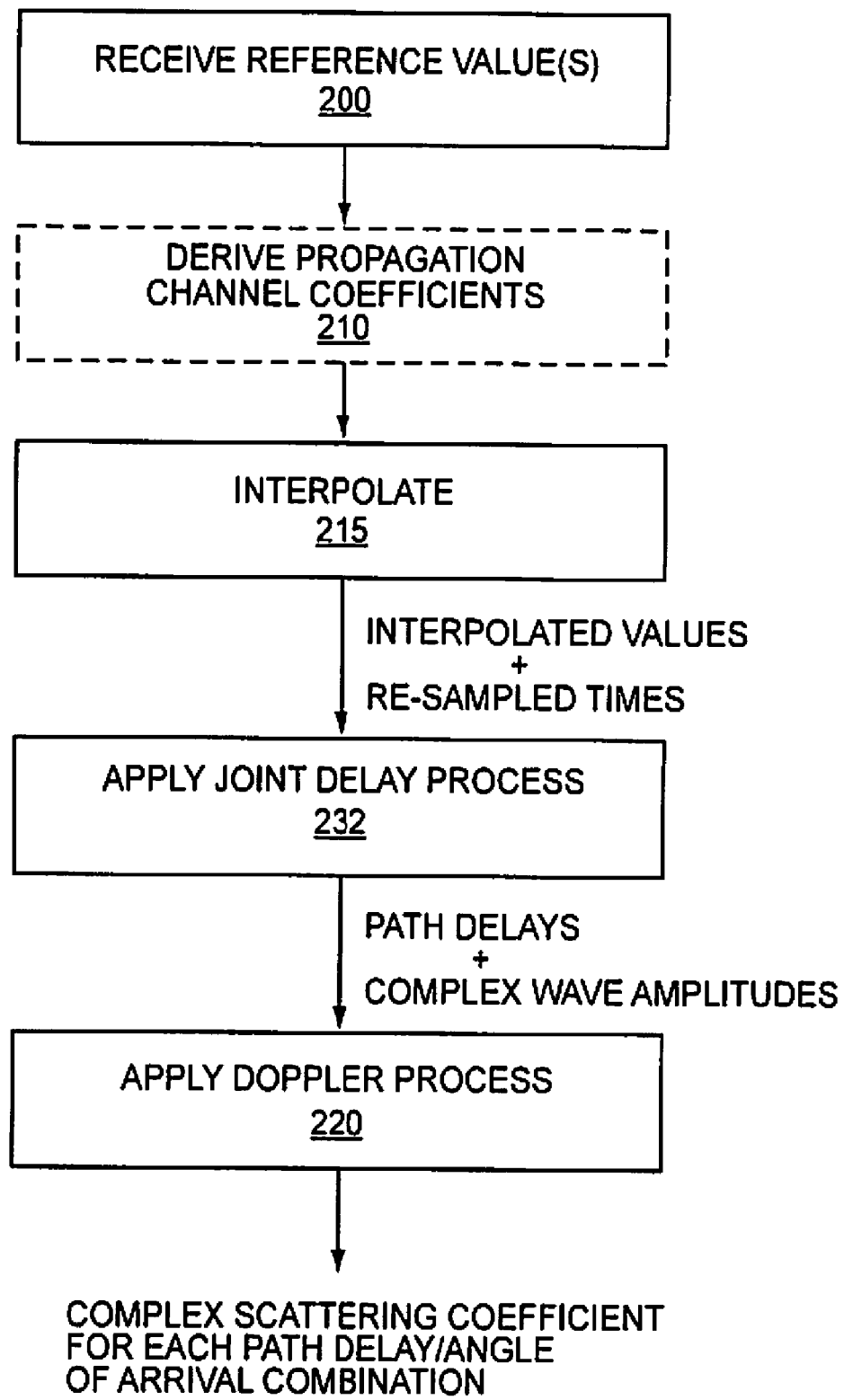
FIG. 10 shows a "delay-first" method as applied to interpolated values according to one exemplary embodiment of the present invention.

The present invention is not restricted to the Doppler-first approach described above. The present invention also applies to a delay-first approach, preferably when interpolation is used. FIG. 10 shows a flow chart for another embodiment that uses a delay-first approach with interpolation. The receiver 120 receives reference signals, e.g., pilot signals, for multiple frequencies in the received signal bandwidth during time interval (i), for example during an OFDM symbol period, and the signal samples committed to memory (block 200). While not required, some embodiments may process the received reference signals to determine the propagation channel coefficients at a number of predetermined frequencies (block 210). The received pilot signals or the channel coefficients derived therefrom are re-sampled by interpolation to obtain interpolated values with a re-sampled time spacing inversely proportional to the frequency to which they pertain (block 215). As a result, the product of the re-sampled time spacing and the corresponding frequency for each interpolated value is constant for across the frequencies.

A joint delay process, e.g., a joint inverse Prony, is applied to the interpolated values across the frequencies and re-sampled times in the analysis interval to obtain a single set of path delays common to all re-sampled times, and a corresponding set of complex wave amplitudes (e.g., delay coefficients) for each re-sampled time (block 232). Subsequently, the delay coefficients are processed using, e.g., a Prony algorithm across the re-sampled times and path delays, to determine a set of frequency-scaled Doppler shifts for each determined path delay and the corresponding scattering coefficients (block 220), where the frequency-scaled Doppler shifts represent rate-of-change-of-delay values and are related to the same angle of arrival for the multiple frequencies. The now identified individual scattering parameters, which include the scattering coefficient and the corresponding angle of arrival and path delay for each scattering object may be used to estimate the complex channel frequency response at any desired time and frequency, e.g., at the sub-carrier frequencies to be used for transmitting in the next transmission period.

Figure 11:
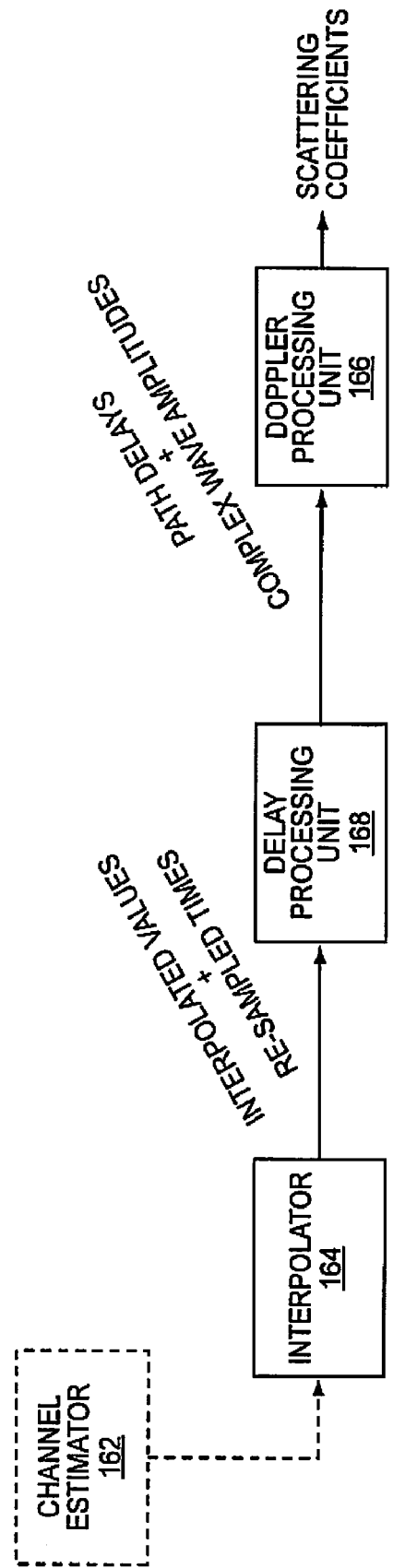
FIG. 11 shows a block diagram of another channel estimation device configured to implement the method of FIG. 10.

FIG. 11 shows a block diagram of an exemplary channel processor 160 used to implement the process of FIG. 10. Processor 160 includes an optional channel estimator 162, an interpolator 164, a delay processing unit 168, and a Doppler processing unit 166. It will be appreciated that while each of these elements is shown as separate entities within the channel processor 160, they may be implemented as one or more processing functions within one or more processors.

When utilized, the channel estimator 162 generates complex propagation channel coefficients based on the input reference signals, e.g., pilot signals. Interpolator 164 re-samples by interpolation the received pilot signals or the channel coefficients derived therefrom to obtain interpolated values having re-sampled time spacings inversely proportional to the corresponding frequency. Delay processing unit 168 jointly processes the interpolated values across a set of the frequencies and re-sampled times, e.g., with a joint inverse Prony algorithm, to determine the set of path delays and the corresponding sets of complex wave amplitudes. Doppler processing unit 166 processes the complex wave amplitudes provided by the delay processing unit 168 using, e.g., a Prony algorithm, to determine the frequency-scaled Doppler shifts for each determined path delay and the corresponding scattering coefficients. As discussed above, any channel estimates derived from the scattering coefficients may be smoothed over time. For example, scattering coefficients associated with weak scattering objects may be de-weighted relative to the scattering coefficients associated with strong scattering objects to generate smoothed channel estimates for at least one frequency and time.

The following provides a mathematical analysis of the delay-first approach. The basic mathematical model of the channel propagation coefficient C(k,i) at frequencies $\omega_0 + k\Delta\omega$ and times $i\Delta T$ is given by Equation (1), which may be rewritten in terms of rate-of-change-of-delay $T'_n$ as:

$$C(k, i) = \sum_{n=1}^{N} \sum_{m=1}^{M(n)} A(n, m) e^{-j(\omega_0 + k\Delta\omega)(T_{mn} + i\Delta T \cdot T'_n)}. \quad (17)$$

The above equation assumes there are N different directions of arrival intervals, and in each interval, there are M(n) scattering paths, which represents the model for the Doppler-first method. As discussed above, in need not be the same for each angular interval, but can be a function on n, e.g., M(n). Preferably, however, each scattering object s would be accorded a unique delay $T_s$ and rate-of-change-of-delay $T'_s$, leading to the single summation over all scattering objects s as follows:

$$C(k, i) = \sum_{s} A'(s) e^{-j(\omega_0 + k\Delta\omega)(T_s + i\Delta T \cdot T'_s)}. \quad (18)$$

Applying the interpolation procedure explained above to calculate interpolated values C'(k,i') at times $\Delta T(k)=(1+k\Delta\omega/\omega_0)\Delta T$, obtains:

$$C'(k, i') = \sum_{s} A'(s) e^{-j(\omega_0 + k\Delta\omega)T_s} e^{-j(i' \omega_0 \Delta T \cdot T'_s)} \quad (19)$$

Letting $A(s)=A'(s)e^{-j\omega_0 T_s}$, $Z_s = e^{-j\Delta\omega T_s}$, and $\xi_s = e^{-j\omega_0 \Delta T \cdot T'_s}$ obtains:

$$C'(k, i') = \sum_{s} A(s) Z_s^k \xi_s^{i'} \quad (20)$$

In Equation (20), the path delay of scattering object s is embodied in the variable $Z_s$, while the rate-of-change-of-delay is embodied in the variable $\xi_s$.

Since Equation (20) has the same form in $Z_s$ and $\xi_s$, either can be determined first, followed by the other. To determine the $Z_s$ first, let $B(s,i')=A(s)\xi_s^{i'}$. Then, Equation (20) may be rewritten as:

$$C'(k, i') = \sum_{s} B(s, i') Z_s^k. \quad (21)$$

This may be solved for the $Z_s$ by the improved Prony method along the k-axis, jointly for all re-sampled times i'.

Then the $Z_s$ values so found are substituted to obtain the least-squares solution for the coefficients B(s,i') at the re-sampled times. Because B(s,i') is defined as $A(s)\xi_s^{i'}$, the latter is solvable by the one-variable Prony method that was equated to a threshold-extension FM demodulator above, to obtain one $\xi_s$ value and one A(s) value for each index s. Thus, path delays may be found first followed by finding rate-of-change-of-delay values.

Because Equation (20) is written as a single sum, each scattering object has a unique combination of path delay and its rate-of-change. Either the path delays may be found first, followed by a single rate-of-change-of-delay per path delay, or else the Doppler shifts (rate-of-change-of-delay values) may be found first, followed by a single path delay corresponding to each Doppler shift.

A problem with the former (delay-first) method arises when two scattering objects have identical path delays, but distinct Doppler shifts: Prony will merge the two identical path delays into one scattering object, and then only a single Doppler will be found. On the other hand, with the Doppler-first approach two scattering objects have exactly the same Doppler shift but distinct path delays. In this case, Prony will merge them into a single scattering object, and then only one path delay will be found. One method to solve this is to revert to the double-sum form of Equation (1) for Equation (20), namely:

$$C'(k, i') = \sum_{n=1}^{N} \sum_{m=1}^{M(n)} A(n, m) Z_{nm}^k \xi_n^{i'} \quad (22)$$

for the Doppler-First ($\xi$ first) analysis, or alternatively $$C'(k, i) = \sum_{m=1}^{M} \sum_{n=1}^{N(m)} A(n, m) Z_m^k \xi_{mn}^i \quad (23)$$

for the delay-first (Z first) method.

Thus, with Equation (22), there is an assumption that there is a number of path delays m smaller than the number of scattering objects, and that for each path delay there are M(n) distinct Doppler shifts. With Equation (23), the assumption is that there is a number M of path delays, with N(m) Doppler shifts for each path delay. In general, it is preferable to use the Doppler-first approach if the number of time periods for the total analysis interval exceeds the number of frequencies, and alternatively to use the delay-first approach if the number of frequencies exceeds the number of time-periods (e.g., OFDM symbol periods) available, as this will enable the maximum number of different scattering parameters to be found.

While no known method exists to solve the single-sum formulation of Equation (20) for Delay-Doppler pairs of which at least one value is distinct from that of another pair, for channel smoothing purposes only, e.g., for interpolation rather than extrapolation, a two-dimensional DFT may be used. Having interpolated the pilot signals or the channel coefficients derived therefrom to different re-sampled times, as described above, the new grid of points C'(k,i') has the property that a DFT along the re-sampled time dimension i' will yield the same Doppler spectrum for each k. After performing these DFTs to obtain a first transformed array, a second DFT along the frequency dimension k of the first transformed array yields a second transformed array wherein scattering objects are now resolved into discrete equally spaced bins in the domain of delay and angle of arrival. Those bins containing values below a noise threshold can now be set to zero, and then the array re-transformed to channel values at desired frequencies and times within the original observation intervals of frequency and time, thereby achieving smoothing.

One application of the latter in GSM is channel smoothing over multiple GSM slots in the same frame. In a frequency-hopped GSM system, slots in the same frame are transmitted on the same frequency, and frequency change occurs only between frames. Frames are 60/13=4.615 ms long, and are divided into 8 slots. Observing the channel in every slot therefore gives a channel sampling rate of 8/4.615 ms, or 1.733 kHz, which is sufficiently above Nyquist sampling for the highest mobile terminal speeds.

The present invention may be used to provide improved channel estimates by means of the following steps:

Perform channel correlation with the sync word in each slot to obtain the propagation channel impulse response $C(t_k, i)$ for each time slot i.

Use a DFT to transform the impulse response of each slot to a corresponding propagation channel frequency response $C(\omega_k, i)$ for each slot.

Re-sample by interpolation along the time domain of corresponding frequency points on the frequency responses to obtain the interpolated values C'(k,i') at re-sampled times i'.

Use two dimensional DFTs to smooth the 2-D array C'(k,i') to remove scattering objects below a noise threshold.

Undo the re-sampling to obtain smoothed $C(\omega_k,i)$ values at the desired slot times i.

Re-transform the smoothed $C(\omega_k,i)$ values using an IDFT to obtain smoothed impulse response values $C(t_k,i)$ for each time slot.

If desired, the process can also yield channel estimates at multiple instants across the slot, in order to compensate for channel changes during a slot.

The above process described in relation to GSM can also be used for CDMA systems such as the 3G WCDMA system also known, in one form, as HSPA. The inventive method described allows the frequency-independent rate-of-change-of-delay spectrum or angular direction of arrival spectrum to be computed, instead of the frequency-dependent Doppler spectrum, which, therefore, can not be computed jointly over all frequencies for which channel values are available at a set of sequential time instants. A person skilled in the art may be able to determine other applications in which such a method is advantageous, for example improved direction-finding on wideband signals, all of which are considered to lie within the scope of the invention as described by the attached claims.

What is claimed is:

1. A method implemented in a wireless device of analyzing multi-path signals received over a wireless communication channel to characterize scattering objects in the wireless communication channel, the method comprising:

receiving a reference value for each of a plurality of frequencies within a signal bandwidth at a plurality of different signal times;

processing said reference values or complex propagation channel coefficients estimated therefrom to determine one of:

a set of Doppler shifts of scattered wave energy and a corresponding set of complex wave amplitudes for each of multiple frequencies within the signal bandwidth, each Doppler shift corresponding to a different angle of arrival; and a set of path delays and a corresponding set of complex wave amplitudes for each of multiple signal times within an analysis interval; and processing said complex wave amplitudes to determine:

a set of path delays corresponding to each angle of arrival or a set of angles of arrival corresponding to each determined path delay; and a complex scattering coefficient for each combination of path delay and angle of arrival, wherein each complex scattering coefficient corresponds to a respective scattering object in the wireless communication channel.

2. The method of claim 1 further comprising interpolating the reference values or the complex propagation channel coefficients estimated therefrom to generate interpolated values at a series of re-sampled times within the analysis interval, wherein the re-sampled times have a different time spacing for different ones of said multiple frequencies such that the product of each time spacing and the corresponding frequency is substantially constant across the multiple frequencies, and wherein processing the reference values or complex propagation channel coefficients estimated therefrom comprises processing the interpolated values.

3. The method of claim 2 wherein processing the interpolated values comprises:
  processing the interpolated values jointly over a number of said multiple frequencies to determine a set of frequency-scaled Doppler shifts common to said multiple frequencies to thereby determine a set of rate-of-change-of-delay values that each correspond to the same angle of arrival for said multiple frequencies; and
  determining the set of complex wave amplitudes for each of said multiple frequencies based on the rate-of-change-of-delay values and the interpolated values.

4. The method of claim 3 wherein processing the interpolated values jointly over a number of the multiple frequencies comprises applying a joint Prony algorithm to the interpolated values over a number of the multiple frequencies.

5. The method of claim 2 wherein processing the interpolated values comprises processing the interpolated values jointly over said series of re-sampled times in the analysis interval to determine the set of path delays common to the re-sampled times and a corresponding set of complex wave amplitudes for each re-sampled time.

6. The method of claim 5 wherein processing said complex wave amplitudes comprises:
  processing the complex wave amplitudes to determine a set of frequency-scaled Doppler shifts for each determined path delay to thereby determine a set of rate-of-change-of-delay values that each correspond to the same angle of arrival across said multiple frequencies; and
  determining a corresponding complex scattering coefficient for each combination of path delay and frequency-scaled Doppler shift based on the rate-of-change-of-delay values and the corresponding complex wave amplitudes.

7. The method of claim 6 wherein processing said complex wave amplitudes comprises processing the complex wave amplitudes using a Prony algorithm to determine the set of frequency-scaled Doppler shifts for each determined path delay.

8. The method of claim 5 wherein processing the interpolated values comprises processing the interpolated values jointly using a joint inverse Prony algorithm.

9. The method of claim 1 wherein processing the reference values or the complex propagation channel coefficients estimated therefrom comprises applying a Prony algorithm to the reference values or the complex propagation channel coefficients estimated therefrom to determine the set of Doppler shifts and the corresponding complex wave amplitudes.

10. The method of claim 9 wherein processing said complex wave amplitudes comprises applying an inverse Prony algorithm to the complex wave amplitudes to determine the sets of path delays and the corresponding scattering coefficients.

11. The method of claim 1 further comprising processing the received reference values to estimate the complex propagation channel coefficients at each of the multiple frequencies for the plurality of different signal times.

12. The method of claim 1 further comprising predicting channel estimates for one or more transmit frequencies associated with a fixed network station based on the path delays.

13. The method of claim 12 wherein predicting the channel estimates further comprises predicting the channel estimates for said transmit frequencies at future times based on said Doppler shifts and angles of arrival.

14. The method of claim 13 wherein predicting the channel estimates further comprises smoothing the predicted channel estimates for at least one of the transmit frequencies and one of the future times based on the determined combinations of path delays and angles of arrival.

15. The method of claim 14 wherein smoothing the channel estimates comprises de-weighting the scattering coefficients corresponding to the weak scattering objects relative to the scattering coefficients corresponding to the strong scattering objects to determine the smoothed channel estimates for at least one of the transmit frequencies and future times.

16. The method of claim 1 wherein the wireless device is incorporated into a fixed network station, and wherein receiving the plurality of reference values comprises receiving the plurality of reference values from one or more mobile stations.

17. The method of claim 1 further comprising determining a location of at least one of the mobile stations based on the determined combinations of path delays and angles of arrival.

18. The method of claim 1 wherein the plurality of frequencies comprise a plurality of OFDM subcarriers and the plurality of different signal times comprise a plurality of OFDM symbol periods.

19. A wireless device for analyzing multi-path signals received over a wireless communication channel to characterize scattering objects in the wireless communication channel, the device comprising:
  a receiver configured to receive a reference value for each of a plurality of frequencies within a signal bandwidth at a plurality of different signal times;
  a first processing unit configured to process said reference values or complex propagation channel coefficients estimated therefrom to determine one of:
    a set of Doppler shifts of scattered wave energy and a corresponding set of complex wave amplitudes for each of multiple frequencies within the signal bandwidth, each Doppler shift corresponding to a different angle of arrival; and
    a set of path delays and a corresponding set of complex wave amplitudes for each of multiple signal times within an analysis interval; and
  a second processing unit configured to process said complex wave amplitudes output by the first processing unit to determine:
    a set of path delays corresponding to each angle of arrival or a set of angles of arrival corresponding to each determined path delay; and
    a complex scattering coefficient for each combination of path delay and angle of arrival, wherein each complex scattering coefficient corresponds to a respective scattering object in the wireless communication channel.

20. The device of claim 19 further comprising an interpolator configured to interpolate the reference values or the complex propagation channel coefficients estimated therefrom to generate interpolated values at a series of re-sampled times within the analysis interval, wherein the re-sampled times have a different time spacing for different ones of said multiple frequencies such that the product of each re-sampled time spacing and the corresponding frequency is substantially constant across the multiple frequencies, and wherein the first processing unit processes the reference values or complex propagation channel coefficients estimated therefrom by processing the interpolated values.

21. The device of claim 20 wherein said first processing unit is configured to process the interpolated values jointly over a number of the multiple frequencies to determine a set of frequency-scaled Doppler shifts common to said multiple frequencies to thereby determine a set of rate-of-change-of-delay values that each correspond to the same angle of arrival for said multiple frequencies.

22. The device of claim 21 wherein said first processing unit is configured to determine the set of complex wave amplitudes for each of said multiple frequencies based on the rate-of-change-of-delay values and the interpolated values.

23. The device of claim 21 wherein said first processing unit processes the interpolated values jointly over the number of the multiple frequencies using a joint Prony algorithm.

24. The method of claim 20 wherein the first processing unit is configured to process the interpolated values jointly over said series of re-sampled times to determine the set of path delays common to the re-sampled times and a corresponding set of complex wave amplitudes for each re-sampled time within the analysis interval.

25. The device of claim 24 wherein said second processing unit is configured to process the complex wave amplitudes output by said first processing unit to determine a set of frequency-scaled Doppler shifts for each path delay determined by said first processing unit to thereby determine a set of rate-of-change-of-delay values that each correspond to the same angle of arrival for said multiple frequencies.

26. The device of claim 25 wherein said second processing unit is configured to determine a complex scattering coefficient for each combination of path delay and frequency-scaled Doppler shift based on the rate-of-change-of-delay values and the corresponding complex wave amplitudes.

27. The device of claim 26 wherein said second processing unit is configured to processes the complex wave amplitudes using a joint inverse Prony algorithm.

28. The device of claim 25 wherein the first processing unit is configured to process the interpolated values jointly using a joint inverse Prony algorithm.

29. The device of claim 19 wherein said first processing unit processes the reference values or the complex propagation channel coefficients estimated therefrom using a Prony algorithm to determine the set of Doppler shifts and the corresponding complex wave amplitudes.

30. The device of claim 29 wherein said second processing unit processes the complex wave amplitudes using an inverse Prony algorithm to determine the sets of path delays and the corresponding scattering coefficients.

31. The device of claim 19 wherein the receiver includes a channel estimator configured to process the received reference values to estimate the complex propagation channel coefficients at each of the multiple frequencies for the plurality of different signal times.

32. The device of claim 19 wherein the second processor is further configured to determine smoothed channel estimates for at least one frequency and time instant based on the determined combinations of path delays and angles of arrival.

33. The device of claim 32 wherein the second processor is further configured to de-weight the scattering coefficients corresponding to the weak scattering objects relative to the scattering coefficients corresponding to the strong scattering objects to determine the smoothed channel estimates for at least one frequency and time instant.

34. The device of claim 19 wherein the device is incorporated into a fixed network station, and wherein the receiver receives the plurality of reference values from one or more mobile stations.

35. The device of claim 34 further comprising a channel predictor configured to predict complex propagation channel coefficients for one or more transmit frequencies associated with said fixed network station based on the path delays.

36. The device of claim 34 wherein the channel predictor is further configured to predict the complex propagation channel coefficients for said transmit frequencies at future times based on said Doppler shifts and angles of arrival.

37. The device of claim 34 further comprising a mobile locator configured to determine a location of at least one of the mobile stations based on the determined combinations of delays and angles of arrival.

38. The device of claim 19 wherein the plurality of frequencies comprise a plurality of OFDM subcarriers and the plurality of different signal times comprise a plurality of OFDM symbol periods.

* * * * *

UNITED STATES PATENT AND TRADEMARK OFFICE
CERTIFICATE OF CORRECTION

PATENT NO.         : 8,401,487 B2
APPLICATION NO.    : 12/650201
DATED              : March 19, 2013
INVENTOR(S)        : Dent et al.

It is certified that error appears in the above-identified patent and that said Letters Patent is hereby corrected as shown below:

On the Title Page, in Item (56), under "OTHER PUBLICATIONS", in Column 2, Line 5, delete "Ofdm" and insert -- OFDM --, therefor.

On the Title Page, in Item (56), under "OTHER PUBLICATIONS", in Column 2, Line 7, delete "vo 1. 49," and insert -- vol. 49, --, therefor.

In the Specification

In Column 10, Line 11, delete "Iogpolar" and insert -- logpolar --, therefor.

In Column 10, Line 34, delete "160," and insert -- 170, --, therefor.

In Column 14, Line 41, delete "164" and insert -- 166 --, therefor.

In Column 14, Line 48, delete "166" and insert -- 168 --, therefor.

In Column 14, Line 49, delete "164," and insert -- 166, --, therefor.

In Column 17, Line 39, delete "$r_{mn}$" and insert -- $t_{mn}$ --, therefor.

In Column 18, Line 56, delete "164," and insert -- 166, --, therefor.

In Column 19, Line 26, delete "-25" and insert -- ~25 --, therefor.

In Column 20, Line 20, delete "$\omega(n)$" and insert -- $\varphi(n)$ --, therefor.

In Column 22, Line 24, delete "$t_n - \Delta\theta/\Delta\omega$" and insert -- $t_n - \Delta\theta/\Delta\omega.$ --, therefor.

In Column 24, Line 4, delete "in need" and insert -- m need --, therefor.

Signed and Sealed this
Second Day of July, 2013

Teresa Stanek Rea
*Acting Director of the United States Patent and Trademark Office*

CERTIFICATE OF CORRECTION (continued)
U.S. Pat. No. 8,401,487 B2

In Column 24, Line 21, after Equation (19), insert -- . --.

In Column 24, Line 29, after Equation (20), insert -- . --.

In the Claims

In Column 29, Line 13, in Claim 24, delete "method" and insert -- device --, therefor.